United States Patent [19]

Nakajima et al.

[11] Patent Number: 5,065,578
[45] Date of Patent: Nov. 19, 1991

[54] HYDROSTATIC CONTINOUSLY VARIABLE TRANSMISSION WITH ADJUSTABLE CLUTCH VALVE

[75] Inventors: Yoshihiro Nakajima; Mitsuru Saito; Tsutomu Hayashi, all of Tokyo; Tadashi Tsunoda; Katsumi Yamazaki, both of Saitama; Yoshihiro Yoshida, Tokyo; Kazuhiko Nakamura, Kanagawa, all of Japan

[73] Assignee: Honda Giken Kogyo Kabushiki Kaisha, Tokyo, Japan

[21] Appl. No.: 422,807

[22] Filed: Oct. 17, 1989

[30] Foreign Application Priority Data

Oct. 18, 1988 [JP] Japan .................. 63-262649

[51] Int. Cl.⁵ ............................. F16H 61/40
[52] U.S. Cl. ...................... 60/464; 60/468; 60/488; 60/489
[58] Field of Search .............. 60/464, 468, 487, 488, 60/489, 494

[56] References Cited

U.S. PATENT DOCUMENTS

| | | |
|---|---|---|
| 2,502,546 | 4/1950 | Adams . |
| 2,529,349 | 11/1950 | Nathan . |
| 3,135,087 | 6/1964 | Ebert . |
| 3,455,184 | 7/1969 | Frandsen et al. . |
| 4,628,690 | 12/1986 | Arai et al. ................ 60/464 |
| 4,631,980 | 12/1986 | Ishimori . |
| 4,693,144 | 9/1987 | Eggert . |
| 4,694,649 | 9/1987 | Howeth ................ 60/468 |
| 4,745,748 | 5/1988 | Hayashi et al. . |
| 4,776,165 | 10/1988 | Iino . |
| 4,827,721 | 5/1989 | Hayashi et al. . |
| 4,856,279 | 8/1989 | Kawahara et al. . |
| 4,864,823 | 9/1989 | Ikejiri et al. . |
| 4,916,901 | 4/1990 | Hayashi et al. ............... 60/487 X |
| 4,939,900 | 7/1990 | Furumoto et al. ............. 60/487 X |
| 4,944,154 | 7/1990 | Kawahara et al. ............. 60/487 X |
| 4,951,469 | 8/1990 | Hayashi et al. ............... 60/487 X |

FOREIGN PATENT DOCUMENTS

| | | |
|---|---|---|
| 0254579 | 1/1988 | European Pat. Off. . |
| 0272843 | 6/1988 | European Pat. Off. . |
| 0273633 | 7/1988 | European Pat. Off. . |
| 2363762 | 6/1975 | Fed. Rep. of Germany . |
| 3028 | 2/1966 | Japan . |
| 1021723 | 3/1966 | United Kingdom . |
| 1037406 | 7/1966 | United Kingdom . |
| 1470430 | 4/1974 | United Kingdom . |

Primary Examiner—John T. Kwon
Assistant Examiner—George Kapsalas
Attorney, Agent, or Firm—Lyon & Lyon

[57] ABSTRACT

In a hydrostatic continuously variable transmission in which a clutch valve capable of operating between a clutch-on position for setting a hydraulic closed circuit between a hydraulic pump and a hydraulic motor to a hydraulic transmitting state and a clutch-off position for setting the hydraulic closed circuit to a hydraulic transmission cutting-off state is connected to the hydraulic closed circuit, a pressure bearing chamber for urging the clutch valve to the clutch-off position, and a pressure regulating spring for urging the valve to the clutch-on position are provided in the clutch valve, and a clutch controller for regulating the set load of the pressure regulating spring is connected to the pressure regulating spring. Thus, the degree of the hydraulic transmission between the pump and the motor can be controlled as desired without influence of the viscous change of a working oil. The clutch valve is disposed at one axial end of a transmission shaft.

13 Claims, 17 Drawing Sheets

HYDROSTATIC CONTINOUSLY VARIABLE TRANSMISSION WITH ADJUSTABLE CLUTCH VALVE

BACKGROUND OF THE INVENTION

1. Field of the Invention

The present invention relates to a hydrostatic continuously variable transmission in which a clutch valve capable of operating between a clutch-on position for setting a hydraulic closed circuit to a hydraulic transmitting state and a clutch-off position for setting the hydraulic closed circuit to a hydraulic transmission locking state is connected to the hydraulic closed circuit between a hydraulic pump and a hydraulic motor.

2. Description of the Prior Art

Conventionally, as such a continuously variable transmission, there has been known, for example, such a type of transmission as is disclosed in Japanese Patent Publication No. 3208/1966.

In such a continuously variable transmission, when the degree of a hydraulic transmission from a hydraulic pump to a hydraulic motor is controlled, the discharge amount of hydraulic oil from the high pressure portion of a hydraulic closed circuit is regulated by regulating the opening of a clutch valve by a clutch controller. However, if the viscosity of a working oil is varied by a temperature change, the discharge amount of the hydraulic working oil from the clutch valve is altered even if the clutch valve opening is not varied. Thus, there is a problem that the transmission ratio of the hydraulic transmission is varied.

SUMMARY OF THE INVENTION

The present invention has been accomplished with such circumstances in view and it is an object of the present invention to provide a hydrostatic continuously variable transmission of the type which can accurately control the degree of hydraulic transmission regardless of the viscous change of hydraulic oil.

To accomplish the above object, according to the present invention, a hydrostatic continuously variable transmission is proposed in which a clutch valve is provided with a pressure receiving chamber for urging the clutch valve toward a clutch-off position upon receipt of the pressure of a high pressure portion of a hydraulic closed circuit and a pressure regulating spring for urging the clutch valve toward a clutch-on position, and a clutch controller capable of regulating a set load of the spring is connected to the pressure regulating spring.

According to the present invention, in addition to the arrangement described above, a hydraulic continuously variable transmission in which a pressure regulating spring is constructed to increase its spring constant in response to the operation of a clutch controller toward a clutch-on position is proposed.

According to the arrangement described above, the opening of the clutch valve is determined according to the magnitude relationship between the set load of the pressure regulating spring and the pressure of the pressure receiving chamber introduced from the high pressure portion of the hydraulic closed circuit. Accordingly, when the set load of the pressure regulating spring is regulated by the clutch controller, the opening of the clutch valve is regulated in response to the pressure of the pressure receiving chamber Thus, the discharge amount of the hydraulic oil from the clutch valve can be accurately controlled regardless of the viscous change of the working oil. In this manner, the degree of the hydraulic transmission from the hydraulic pump to the hydraulic motor can be controlled as desired.

According to the second arrangement described above, the set load of the pressure regulating spring can be delicately regulated in the low spring constant range of the pressure regulating spring Accordingly, a clutch-off control and a half-clutch engagement control can be accurately performed. Further, since the set load of the pressure regulating spring can be largely regulated in a high spring constant range, a clutch-on control and an overload avoidance control can be accurately achieved. Therefore, the operating stroke of the clutch controller for regulating the set load of the pressure regulating spring may be relatively short.

Further, according to the present invention, there is proposed a hydrostatic continuously variable transmission comprising a hydraulic pump, a hydraulic motor, a hydraulic closed circuit between said hydraulic pump and said hydraulic motor, and a clutch valve connected to said hydraulic closed circuit and capable of operating between a clutch-on position for setting said hydraulic closed circuit to a hydraulic transmitting state and a clutch-off position for setting said hydraulic closed circuit to a hydraulic transmission cut-off state, wherein said hydraulic pump, said hydraulic motor and said hydraulic closed circuit are arranged on a transmission shaft, and said clutch valve provided at one axial end of said transmission shaft.

According to the above arrangement, it is possible to relatively easily avoid interferences between the clutch valve and the hydraulic pump, hydraulic motor, hydraulic closed circuit and the like when the clutch valve is disposed.

The above and other objects, features and advantages of the invention will become apparent from reading the following description taken in conjunction with the accompanying drawings

BRIEF DESCRIPTION OF THE DRAWINGS

The accompanying drawings illustrate one embodiment of the present invention, wherein.

DESCRIPTION OF THE PREFERRED EMBODIMENTS

Figure 1:
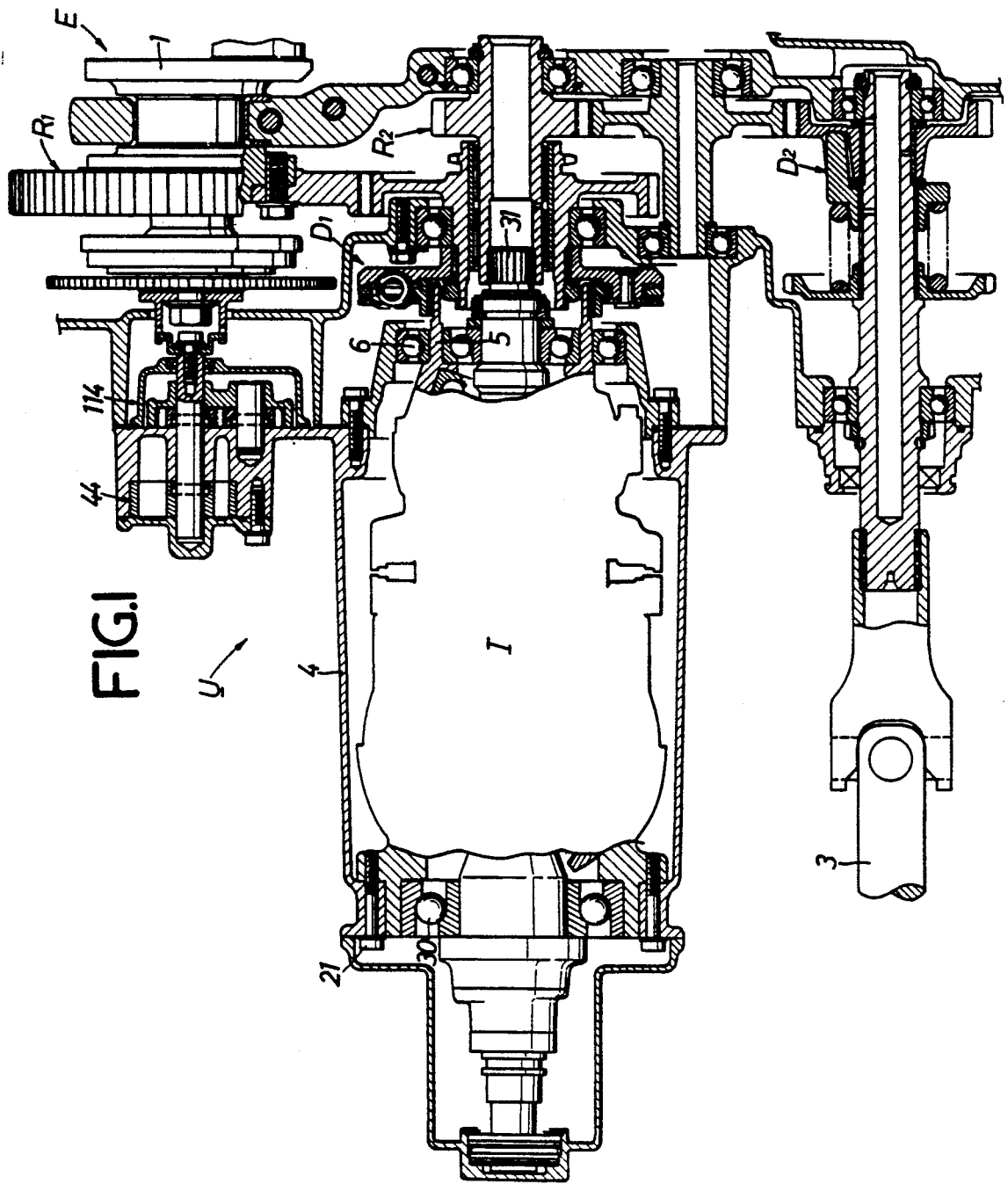
FIG. 1 is a plan view of a power unit for a motorcycle having a hydrostatic continuously variable transmission.

The present invention will now be described by way of an embodiment with reference to the accompanying drawings Referring first to FIG. 1, a power unit U for a motorcycle is comprised of an engine E and a hydrostatic continuously variable transmission T, and a crank shaft of the engine E and the continuously variable transmission T are contained to be supported in a common crank case 4.

The continuously variable transmission T includes an input member 5 rotatably supported through a ball bearing 6 by the intermediate wall of the crank case 4. An output shaft 31 surrounded by the input member 5. The input member 5 and the output shaft 33 are disposed in parallel with the crank shaft 1. The crank shaft 1 drives the input member 5 through a primary transmission $R_1$ and a primary torque damper $D_1$, and the output shaft 31 drives the rear wheel (not shown) of the motorcycle through a secondary torque damper $D_2$ and a propeller shaft 3.

Figure 2:
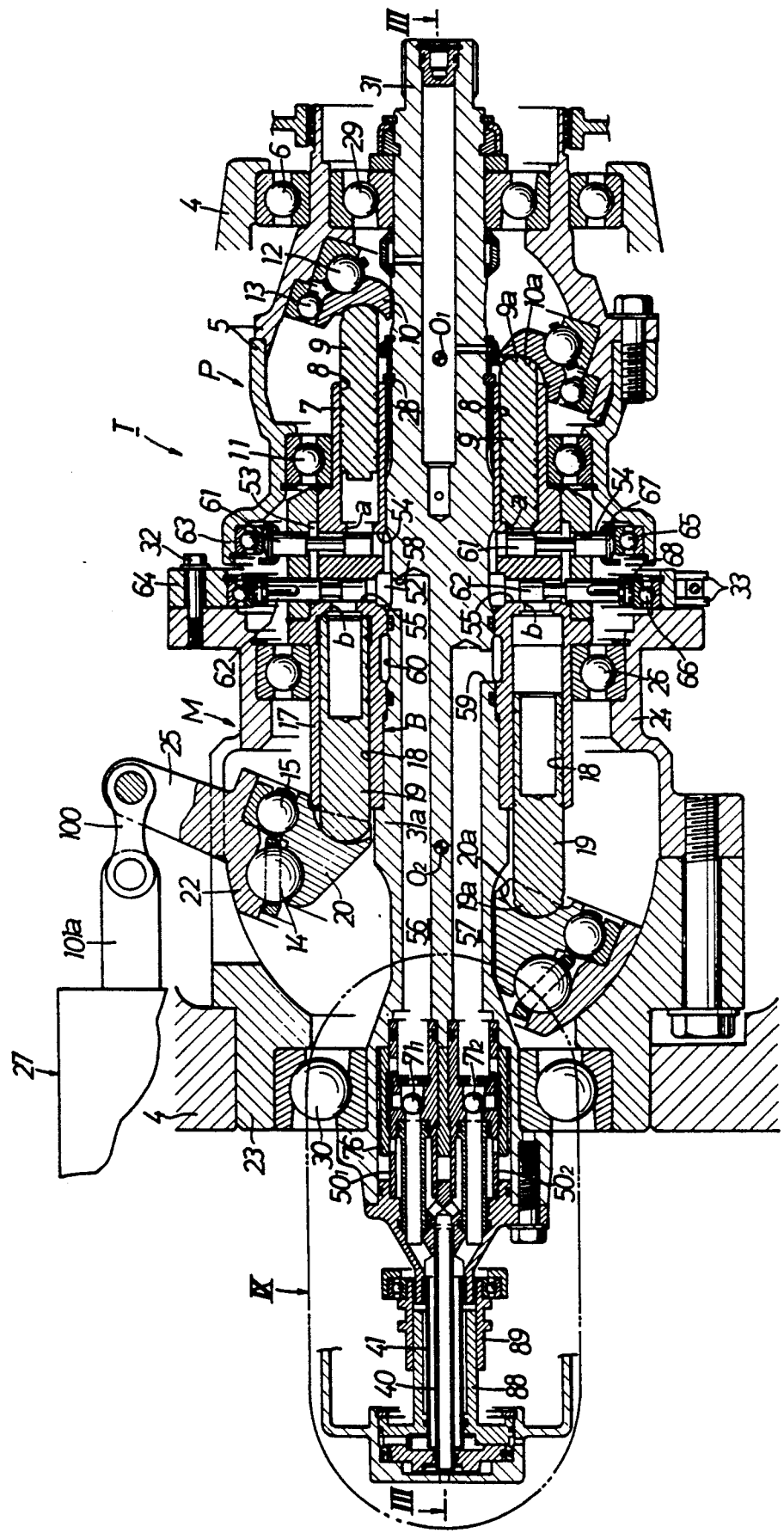
FIG. 2 is a longitudinal sectional view of the continuously variable transmission.
Figure 3:
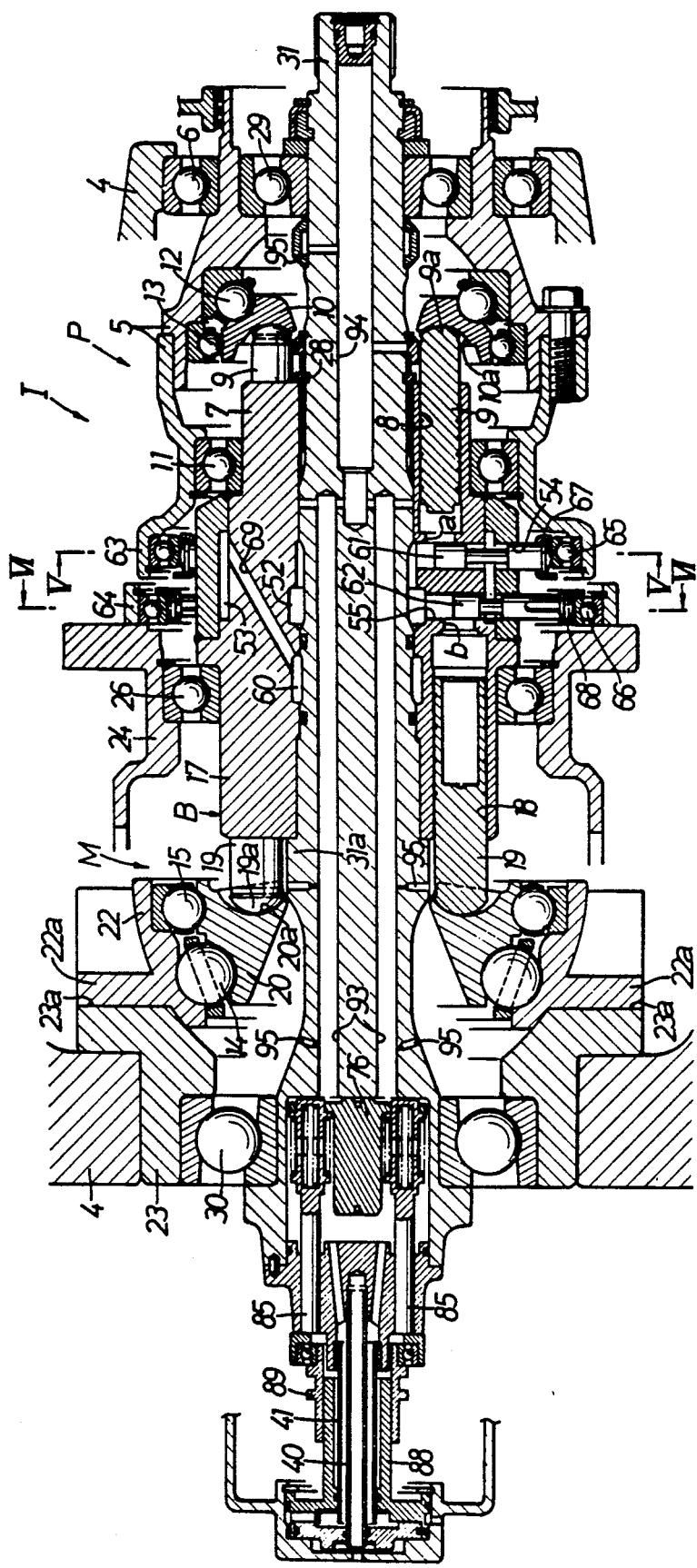
FIG. 3 is a longitudinal sectional view taken along line III—III of FIG. 2.

Referring to FIGS. 2 and 3, the continuously variable transmission T is comprised of a constant volume swash plate type hydraulic pump P and a variable volume swash plate type hydraulic motor M.

The hydraulic pump P is composed of a pump cylinder 7 relatively rotatably supported by the inner peripheral wall of the input member 5 through a ball bearing 11, a number of pump plungers 9, 9 - each slidably fitted in each of an odd number of annularly arranged cylinder bores 8, 8 - provided in the pump cylinder 7 around the center (or axis of rotation) thereof, and a pump swash plate 10 abutting at the front face against the outer ends of the pump plungers 9, 9 -. The pump swash plate 10 is rotatably supported at its back surface on an inner end wall of the input member 5 through an angular contact bearing 12 and a radial ball bearing 13 in an attitude inclined about a phantom trunnion axis $0_1$ perpendicularly to the axis of the pump cylinder 7 and at a given angle with respect to the axis of the pump cylinder 7. The angular contact bearing 12 is constructed to impart a centering operation to the pump swash plate 10.

The pump swash plate 10 reciprocates the pump plungers 9, 9 - during the rotation of the input member 5 to repeat suction and discharge strokes.

On the other hand, the hydraulic motor M has a motor cylinder 17 disposed coaxially with the pump cylinder 7 on the left side thereof, motor plungers 19, 19 - each slidably fitted in each of an odd number of annularly arranged cylinder bores 18, 18 - provided in the motor cylinder 17 around the axis of rotation thereof, a motor swash plate 20 abutting against the outer ends of the motor plungers 19, 19 - , a motor swash plate holder 22 for supporting the motor swash plate 20 through the angular contact bearing 14 and the radial ball bearing 15, and a swash plate anchor 23 for supporting the back surface of the swash plate holder 22.

The hydraulic motor M is so formed that the cylinder bores 18 and the motor plungers 19 are larger in their diameters than are the cylinders 8 and the plungers 9 of the hydraulic pump P so that the maximum volume of the motor M is larger than that of the hydraulic pump P.

Figure 4:
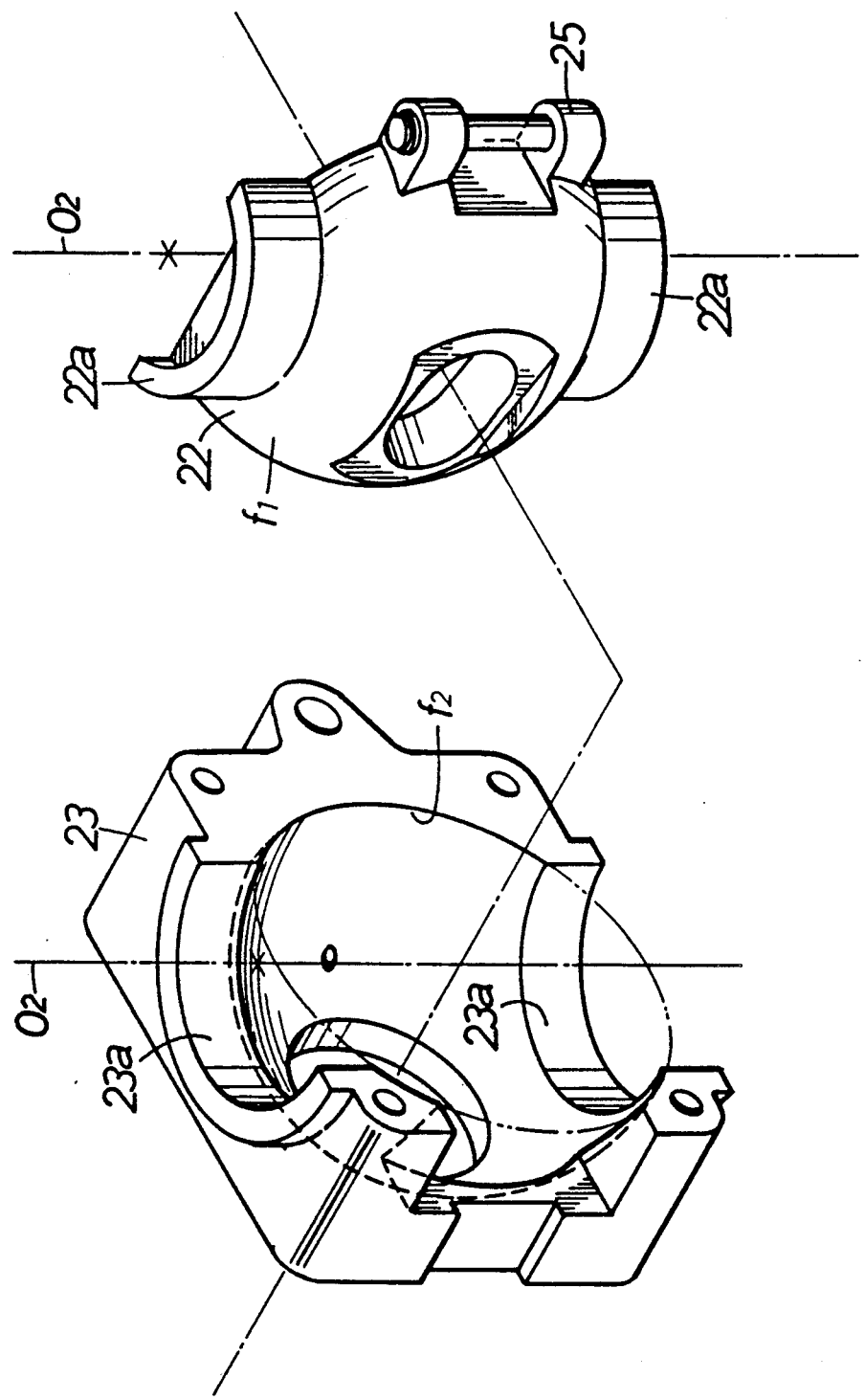
FIG. 4 is an exploded perspective view of a portion of the continuously variable transmission.

As shown in FIG. 4, the opposing surfaces $f_1$ and $f_2$ of the motor swash plate holder 22 and the motor swash plate anchor 23 for abutting against each other are each formed with spherical surfaces in which the crossing point of the axis of the motor cylinder 17 and the trunnion axis $0_2$ is as a center.

The motor swash plate holder 22 is integrally constituted of a pair of hemispherical trunnion shafts 22a and 22a disposed on the trunnion axis $O_2$ perpendicular to the axis of rotation of the motor cylinder 17 at both ends thereof, which are rotatably fitted in a pair of hemispherical recesses 23a and 23a formed at both ends of the motor swash plate anchor 23.

Referring back to FIGS. 2 and 3, the angular contact bearing 14 is constructed to impart a centering operation to the motor swash plate 20 in cooperation with the motor swash plate holder 22.

The motor swash plate anchor 23 is fitted over the left side wall of the crank case 4 together with a cylindrical cylinder holder 24 connected to the right end thereof with a bolt 21 (See FIG. 1). The cylinder holder 24 rotatably supports the outer periphery of the motor cylinder 17 through a ball bearing 26.

The motor swash plate 20 is moved by the rotation of the motor swash plate holder 22 between an upright position perpendicular to the axis of the motor cylinder 17 and a maximum inclined position inclined at a certain angle, and in the inclined state reciprocates the motor plungers 19, 19 - upon rotation of the motor cylinder 17 to repeat expansion and retraction strokes of the motor plungers 19.

An operating arm 25 extending in a direction perpendicular to the trunnion axis $O_2$ integrally projects from one side of the motor swash plate holder 22, and a transmission controller 27 for controlling the inclined angle of the motor swash plate 20 is connected to the operating arm 25. The transmission controller 27 will be described below.

The pump cylinder 7 and the motor cylinder 17 compose an integral cylinder block B to be integrally coupled, and an output shaft 31 centrally penetrates through the cylinder block B. The outer end of the motor cylinder 17 is mated against a flange 31a integrally formed around the outer periphery of the output shaft 31, the pump cylinder 7 is mated against a stopper ring 28 fitted over the outer periphery of the output shaft 31, and the cylinder block B (the pump cylinder 7 in the embodiment as shown) is spline-fitted over the output shaft 31. Thus, it is ensured that the cylinder block B is secured to the output shaft 31.

The right end of the output shaft 31 also penetrates through the pump swash plate 10 to extend out of the input member 5 and rotatably supports the input member 5 through the angular contact bearing 29 out of the pump swash plate 10.

The left end of the output shaft 31 extends to penetrate through the motor swash plate 20, the motor swash plate holder 22 and the motor swash plate anchor 23, and rotatably supports the motor swash plate anchor 23 through the angular contact bearing 30.

As described above, the continuously variable transmission T is arranged in one assembly from the input member 5 to the output shaft 31 with the input member 5 spline fitted at the right end thereof as seen in FIG. 2 with the output member of the primary torque damper $D_1$ and with the output shaft 31 spline fitted also at the same end with the input member of the secondary torque damper $D_2$.

In order to rotate the pump swash plate 10 synchronously with the pump cylinder 7, a spherical recess 10a for engaging the spherical end 9a of the corresponding pump plunger 9 is formed on the pump swash plate 10.

In order to rotate the pump swash plate 10 synchronously with the motor cylinder 17, a spherical recess 20a for engaging the spherical end 19a of the corresponding motor plunger 19 is formed on the motor swash plate 20.

The spherical recesses 10a and 20a are all formed in a radius larger than that of the corresponding spherical ends 9a and 19a so as to obtain the engaging state of the spherical ends 9a and 19a with the recesses 10a and 20a at any position.

Figure 5:
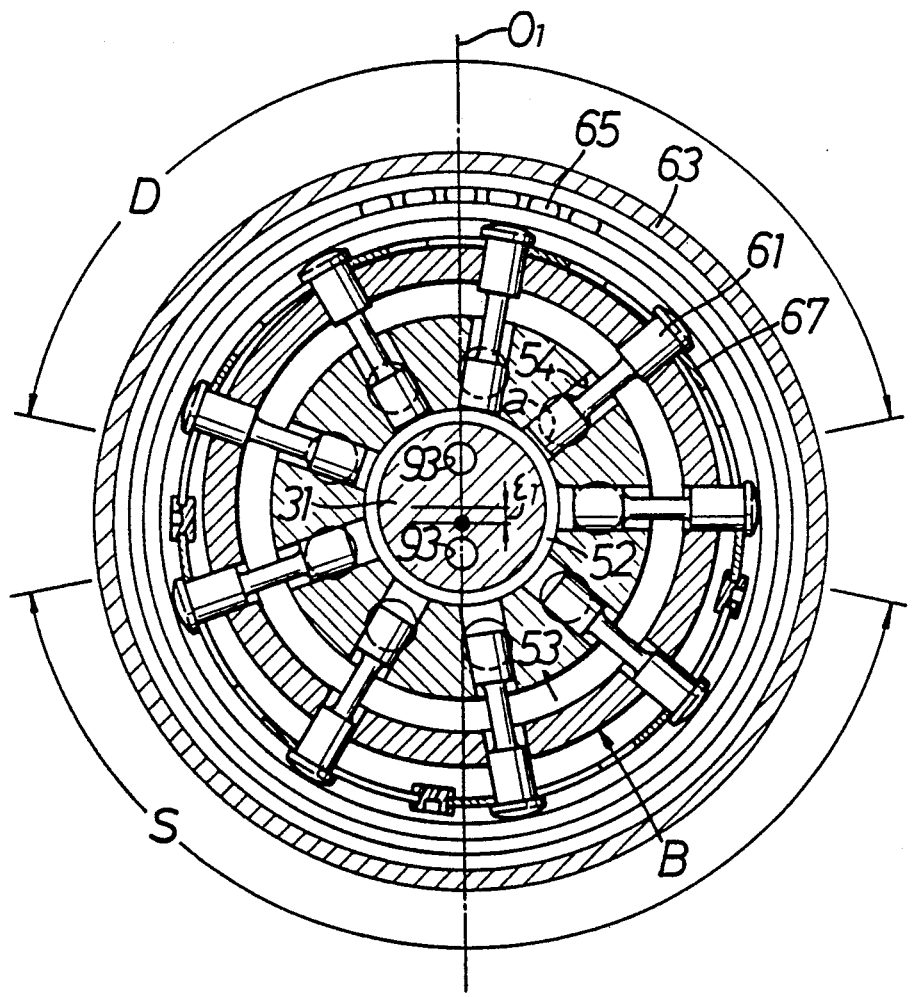
FIGS. 5 and 6 are sectional views taken along lines V—V and VI—VI of FIG. 3, FIGS. 7 and 8 are explanatory views of the operations corresponding to FIG. 6.

Referring to FIGS. 2, 3 and 5, provided in the cylinder block B between the group of the cylinder bores 8, 8 - of the pump cylinder 7 and the group of the cylinder bores 18, 18 - of the motor cylinder 17 are inner and outer annular oil passages 52 and 53 concentrically arranged about the output shaft 31, first and second valve bores 54, 54 - and, 55, 55 - , of the same number as the cylinder bores 8, 8 - and 18, 18, which radially penetrate through an annular partition wall between both the oil passages 52 and 53 and the outer peripheral wall of the outer oil passage 53, and a number of pump ports a, a - for permitting the cylinder bores 8, 8 - to communicate with the adjacent first valve bores 54, 54 - , and a number of motor ports b, b - for permitting the cylinder bores 18, 18 - to communicate with the adjacent second valve bores 55, 55 - .

The inner oil passage 52 is defined as an annular groove on the inner periphery of the cylinder block B, and the open surface is closed by the outer periphery of the output shaft 31.

First spool type distributor valves 61 and 61 are slidably fitted in the first valve bores 54, 54 - , and second spool type distributor valves 62 and 62 are slidably fitted in the second valve bores 55, 55 - . A first eccentric wheel 63 surrounding the first distributor valves 61, 61 - is engaged with the outer ends of the first distributor valves 61, 61 - , and a second eccentric wheel 64 surrounding the second distributor valves 62, 62 - is engaged with the outer ends of the second distributor valves 61, 61 - through ball bearings 65 and 66, respectively. In order to force the engagements, the outer ends of the first distributor valves 61, 61 - are each connected to a first forcible wheel 67 in a concentric relation to the first eccentric wheel 63, and the outer ends of the second distributor valves 62, 62 - are each connected to a second forcible wheel, 68 in a concentric relation to the second eccentric wheel 64.

The first eccentric wheel 63 is connected integrally to the inner end of the input member 5, and, as shown in FIG. 5, disposed at a position eccentrically displaced by a given distance $\epsilon_1$ from the center of the output shaft 31 along the phantom trunnion axis $O_1$ of the pump swash plate 20.

Thus, if relative rotation occurs between the input member 5 and the pump cylinder 7, each first distributor valve 61 reciprocates within the first valve bore 54 between the radial inner and outer positions of the pump cylinder 7 for a stroke of a distance twice the eccentric amount $\epsilon_1$ of the first eccentric wheel 63. As shown in FIG. 5, the first distributor valve 61 is moved at the inner position side to communicate the corresponding pump port a with the outer oil passage 53 and to inhibit the communication with the inner oil passage 52 in the discharge region D of the hydraulic pump P. The working oil is fed under pressure by the pump plunger 9 during the discharging stroke from the cylinder bore 8 to the outer oil passage 53. The first distributor valve 61 is moved at the outer position side to communicate the corresponding pump port a with the inner oil passage 52 and to inhibit the communication with the outer oil passage 53 in the suction region S, and the working oil is taken into the cylinder bore 8 by the pump plunger 9 during the section stroke from the inner oil passage 52 to the cylinder bore 8.

Figure 6:
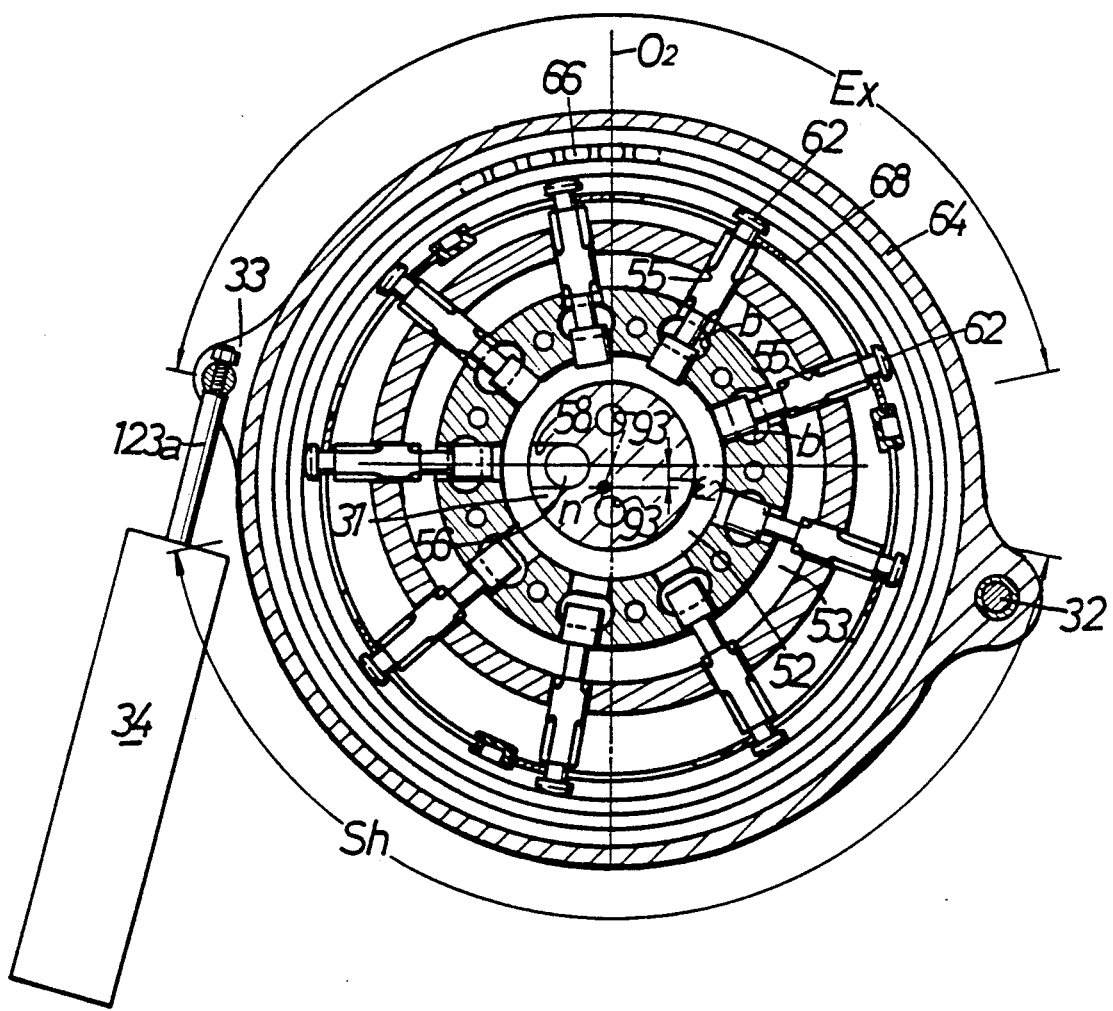
Figure 7:
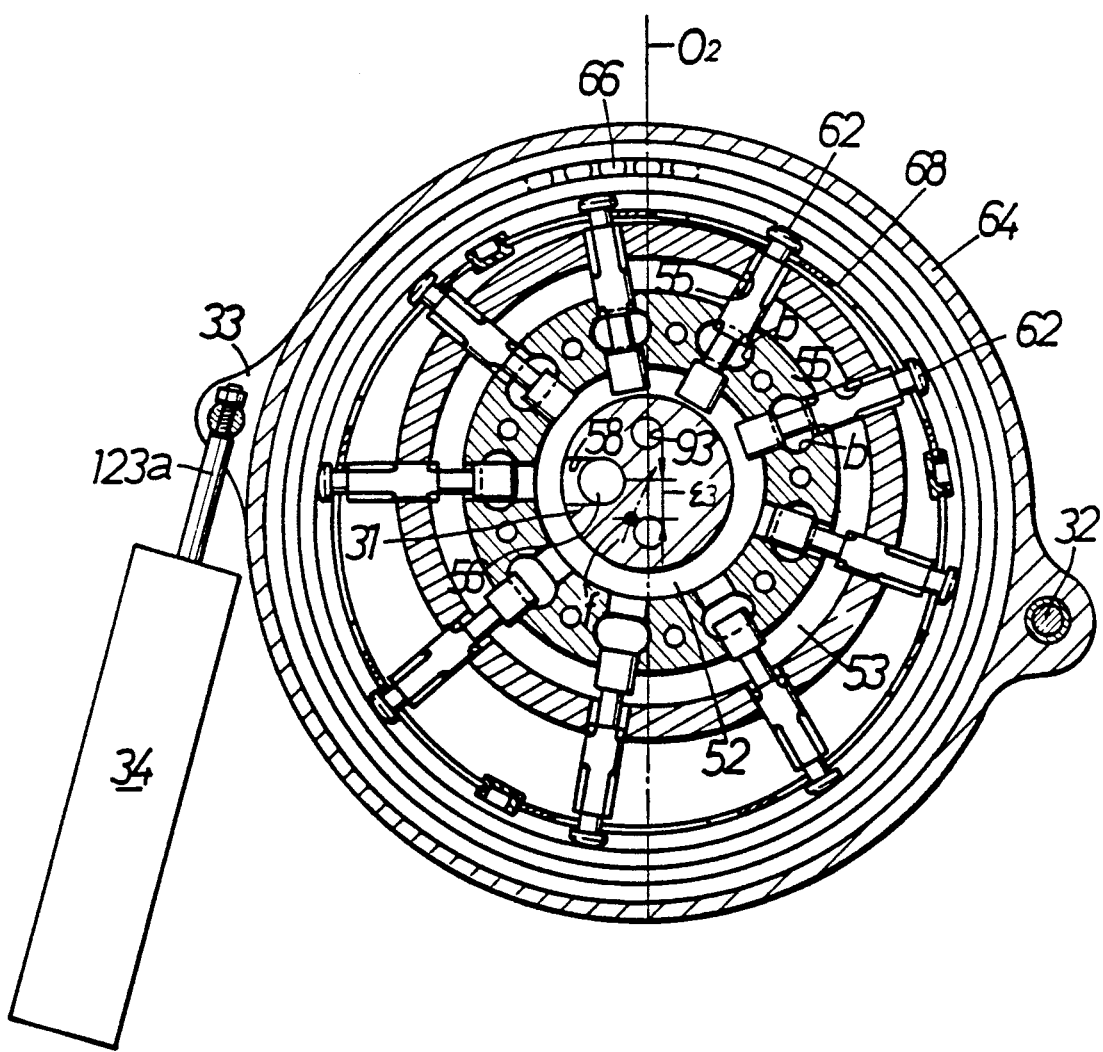
Figure 8:
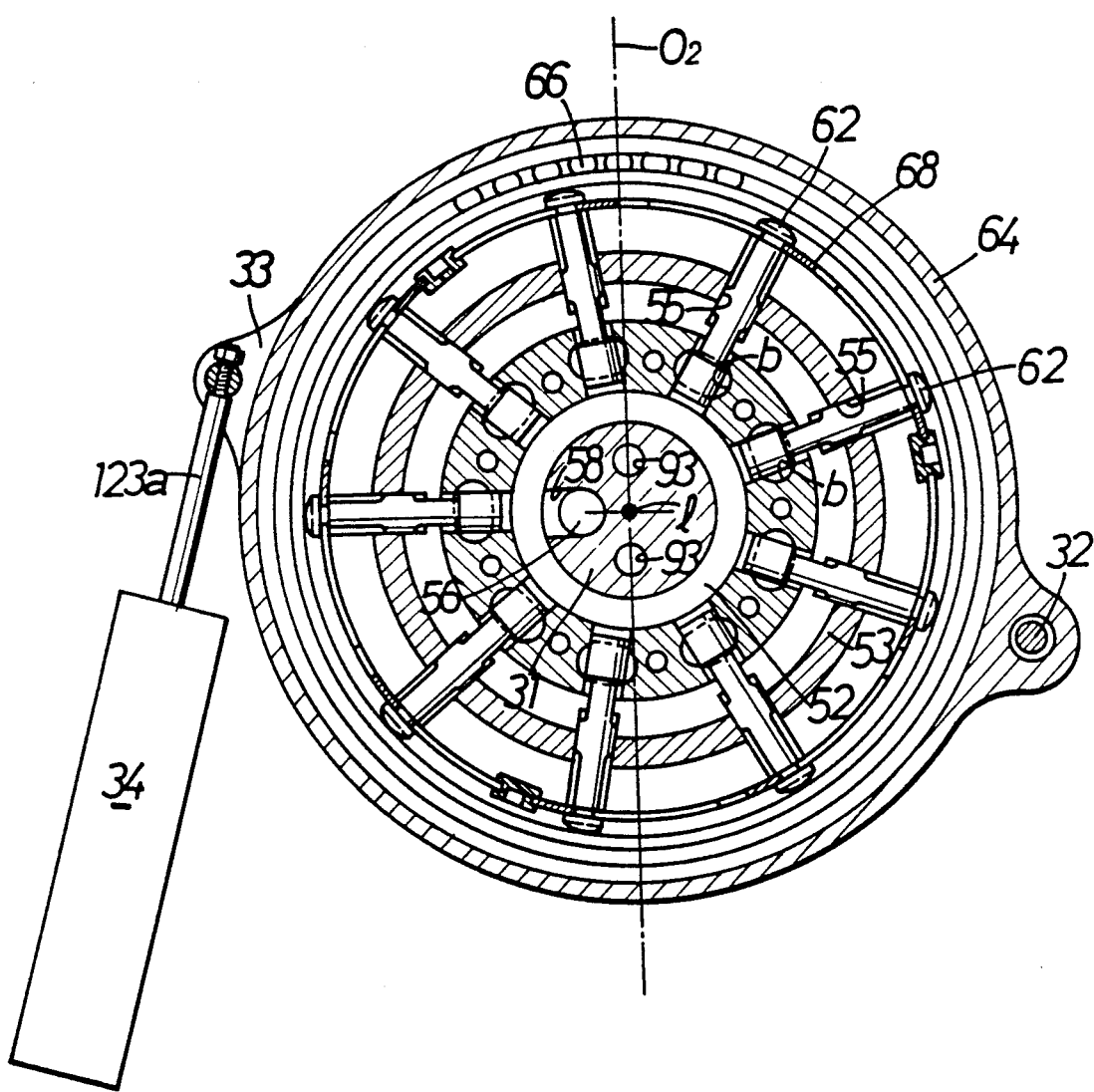

The second eccentric wheel 64 is swingably connected, as shown in FIGS. 2, 6, 7, and 8, to the cylinder holder 24 through a pivot 32 parallel to the output shaft 31 among a clutch-on position n, a clutch-off position f, and a lockup position l of three positions. The second eccentric wheel 64 occupies, in the clutch-on position n, a position (FIG. 6) eccentrically displaced by a given distance $\epsilon_2$ from the center of the output shaft 31 along the trunnion axis $O_2$, and occupies, in the clutch-off position f, a position (FIG. 7) eccentrically displaced by a given distance $\epsilon_3$ which is greater than the eccentric distance $\epsilon_2$ from the center of the output shaft 31. The second eccentric wheel 64 occupies, in a lockup position l, the position concentric with the output shaft 31 (FIG. 8).

The second eccentric wheel 64 has an ear 33 integral with the second eccentric wheel 64 and protruding outwardly from the peripheral wall opposite to the pivot 32, and an eccentric wheel controller 34 for controlling the second eccentric wheel 64 to the three positions is connected thereto. The eccentric wheel controller 34 will be described below.

If the second eccentric wheel 64 is shifted to the clutch-on position n as shown in FIG. 6 when the motor cylinder 17 is rotated, each second distributor valve 62 is reciprocated by the second eccentric wheel 64 between the radial inner and outer positions at a stroke distance twice as large as the eccentric distance $\epsilon_2$ in the second valve bore 55. In the expansion region Ex of the hydraulic motor M, the second distributor valve 62 is moved to the inner position side to allow the corresponding motor port b to communicate with the outer oil passage 53 and to inhibit communication with the inner oil passage 52. Thus, the working oil of a high pressure is supplied from the outer oil passage 53 to the cylinder bore 18 of the motor plunger 19 during the expansion stroke. In the retraction region Sh, the second distributor valve 62 is moved to the outer position side to allow the corresponding motor port b to communicate with the inner oil passage 52 and to inhibit communication with the outer oil passage 53, and the working oil is discharged from the cylinder bore 18 of the motor plunger 19 during the retraction stroke to the inner oil passage 52.

If the second eccentric wheel 64 is shifted to the clutch-off position f as shown in FIG. 7, each second distributor valve 62 is reciprocated by the second eccentric wheel 64 between the radial inner and outer positions at a stroke twice as large as the eccentric distance $\epsilon_3$ in the second valve bore 55. Thus, the second distributor valve 62 is opened at the outer oil passage 53 at the inner and outer positions to allow oil flow out of the cylinder block B.

If the second eccentric wheel 64 is shifted to the lockup position l as shown in FIG. 8, all the second distributor valves 62, 62 - simultaneously close the corresponding motor ports b, b.

In the arrangement described above, when the input member 5 of the hydraulic pump P is rotatably driven by the engine E in the state that the second eccentric wheel 64 is held in the clutch-on position n, the pump plungers 9, 9 - are alternatively subject to discharge and suction strokes by the pump swash plate 10.

The pump plungers 9 fed working oil under pressure from the cylinder bore 8 to the outer oil passage 53 during the passage of the discharge stroke region D, and intake the working oil from the inner oil passage 52 to the cylinder bore 8 during the passage of the intake stroke region S.

The high pressure working oil passed into the outer oil passage 53 is supplied into the cylinder bore 18 of the motor plunger 19 located in an expansion stroke region Ex of the hydraulic motor M, while the working oil is discharged by the motor plunger 19 located in the retraction stroke region Sh from the cylinder bore 18 to the inner oil passage 52.

During this operation, the cylinder block B is rotated by the sum of a reaction torque received by the pump cylinder 7 from the pump swash plate 10 through the pump plungers 9 which are in the discharge stroke and a reaction torque received by the motor cylinder 17 from the motor swash plate 20 through the motor plungers 19 which are in the expansion stroke. That rotational torque is transmitted from the output shaft 31 to the secondary reduction gear 3.

In this case, the shift ratio of the output shaft 31 to the input member 5 is given by the following equation:

$$\text{Shift ratio} = 1 + \frac{\text{Volume of the hydraulic motor } M}{\text{Volume of the hydraulic pump } P}$$

Accordingly, the shift ratio can be varied from the maximum value (low speed state) to 1 (top speed state) if the volume of the hydraulic motor M is changed from the maximum value to zero. Because the volume of the hydraulic motor M is determined by the stroke of the motor plunger 19, the shift ratio can be continuously controlled from the maximum value to 1 by providing the tilting displacement of the motor swash plate 20 from the inclined position to the upright position.

During the operation of the transmission T, the pump swash plate 10 receives a thrust load from the group of the pump plungers 9, 9 - , while the motor swash plate 20 receives a thrust load from the group of the motor plungers 19, 19 - , these thrust loads being in opposite directions to each other, but the thrust load received by the pump swash plate 10 is borne on the output shaft through the angular contact bearing 12, the input member 5 and the angular contact bearing 29, whilst the thrust load received by the motor swash plate 20 is similarly borne on the output shaft 31 through the angular contact bearing 14, the motor swash plate holder 22, the motor swash plate anchor 23 and the angular contact bearing 30. Therefore, these thrust loads merely cause the output shaft 31 to produce a tensile stress, and will not act on the crank case 4 supporting the output shaft 31 at all.

In the above case, the motor swash plate holder 22 and the motor swash plate anchor 23 face oppositely at their spherical surfaces $f_1$ and $f_2$ having a crossing point between the axis of the motor cylinder 17 and the trunnion axis $O_2$ as a center. Accordingly, the motor swash plate holder 22 performs a centering function by the interaction of these spherical surfaces As a result, the motor swash plate holder 22 can smoothly rotate around the trunnion axis $O_2$, and can easily control the inclining angle of the motor swash plate 20. Further, the rotation of the motor swash plate holder 22 around the axis except the trunnion axis $O_2$ is prevented by the engagement of the trunnion shaft 22a of the motor swash plate holder 22 with the recess 23a of the motor swash plate anchor 23.

In the hydraulic pump P and the hydraulic motor M, the swash plates 10 and 20 are effected longitudinally by the centering action by means of the spherical ends 9a and 19a of the corresponding plungers 9 and 19 and the angular contact bearings 12 and 14, and borne on the outer peripheries thereof by the radial ball bearings 13 and 15. Accordingly, the swash plates 10 and 20 are held at their home positions at any inclined state to be accurately synchronously rotated with the cylinder block B.

Then, when the second eccentric wheel 64 is shifted to the clutch-off position f, the high pressure outer oil passage 53 is opened by the second distributor valve 62 out of the cylinder block B. Accordingly, the high pressure working oil is not supplied to the hydraulic motor M, and the power transmission from the hydraulic pump P to the hydraulic motor M is cut off. That is, a so-called clutch-off state is obtained.

If the second eccentric wheel 64 is shifted to the lockup position 1 when the motor swash plate is upright, i.e., when the top speed state is obtained, all the second distributor valves 62 simultaneously close the corresponding motor ports b. Accordingly, the hydraulic motor M is insulated from the high pressure outer oil passage 53 and the low pressure inner oil passage 52, thereby reducing the leakage of the hydraulic oil from the hydraulic motor M. Since the outer oil passage 53 is insulated from the hydraulic motor M, the volume of the high pressure system including the outer oil passage 53 is reduced, and the noncompressibility of the working oil of the high pressure system is improved even if the working oil slightly contains air bubbles. As described above, the transmission efficiency in the top speed state is improved.

Figure 9:
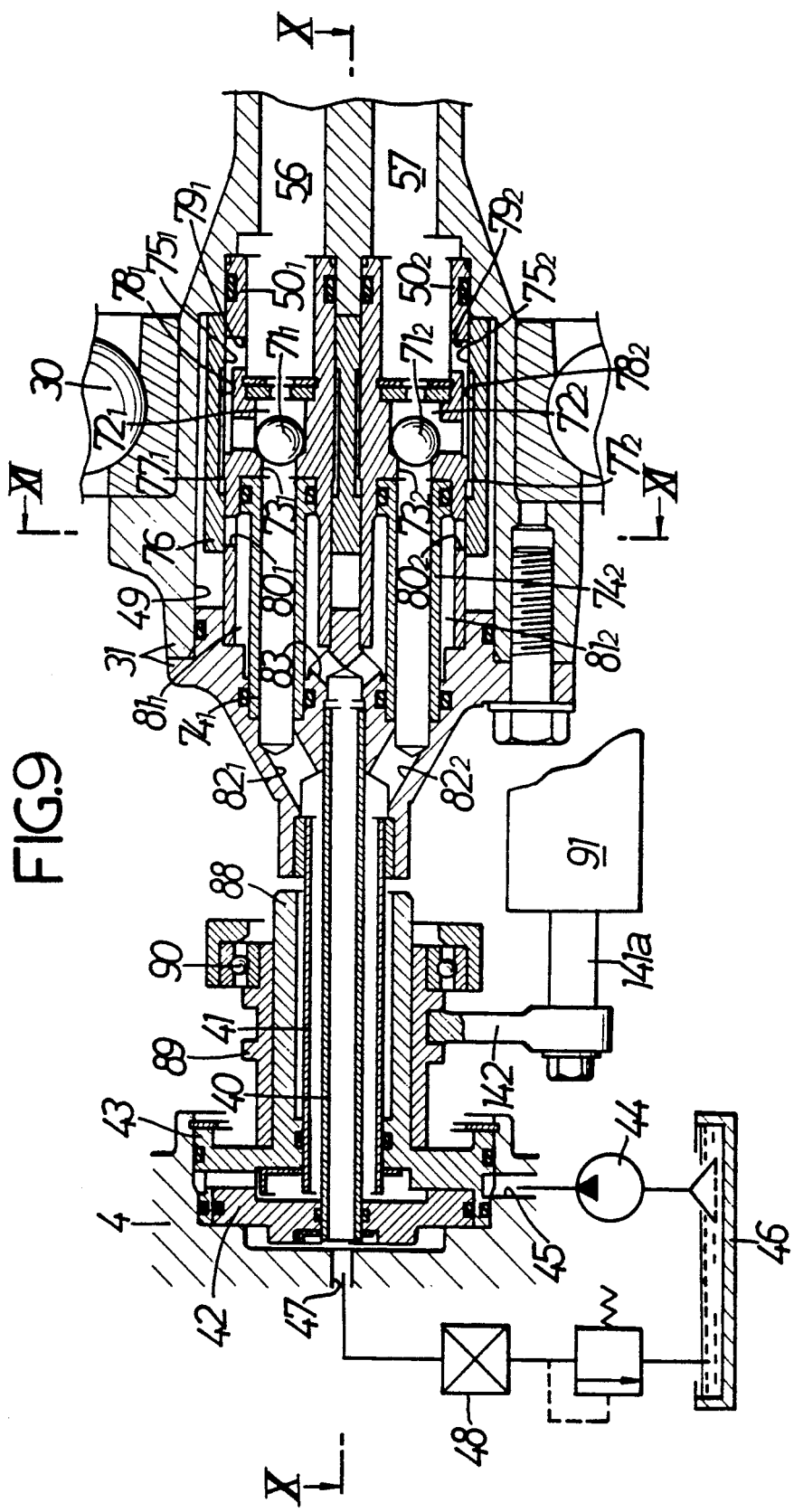
FIG. 9 is an enlarged view of the portion IX of FIG. 2, FIGS. 10 and 11 are longitudinal sectional views taken along lines X—X and XI—XI of FIG. 9.

Next, a working oil supplying mechanism to the inner and outer oil passages 52 and 53 will be described with reference to FIGS. 9 to 11.

Inner and outer oil guide tubes 40 and 41 are attached to the left end wall of the crank case 4 facing the left end of the output shaft 31 through supporting plates 42 and 43, and the ends of the oil guide tubes, 40 and 41 are fitted relatively rotatably and oil-tightly over the left end of the output shaft 31. An oil supply passage 45 for guiding oil discharged from a supply pump 44 to the outer oil guide tube 41 and a return oil passage 47 for guiding oil discharged from the inner oil guide tube 40 to an oil reservoir 46 are provided in the left end wall of the crank case 4. An oil cooler 48 is interposed in the way of the return oil passage 47.

A pair of first and second valve cylinders $50_1$ and $50_2$ parallel to the axis of the output shaft 31 are bridged over both the end walls of a cylindrical valve chamber 49 formed at the left end of the output shaft 31, and low and high pressure oil passages 56 and 57 in communication with the first and second valve cylinders $50_1$ and $50_2$ are perforated in the output shaft 31.

As shown in FIGS. 2 and 3, the low pressure oil passage 56 is connected to an inner oil passage 52 through a lateral hole 58, and the high pressure oil passage 57 is connected to the outer oil passage 53 through the lateral hole 59, an annular oil passage 60 and an oblique hole 69.

Referring back to FIGS. 9 to 11, the first and second valve cylinders $50_1$ and $50_2$ have small chambers $72_1$ and $72_2$ containing first and second check valves $71_1$ and $71_2$ in the intermediate portions thereof. Valve holes $73_1$ and $73_2$ which are opened and closed by the corresponding check valves $71_1$ and $71_2$ are perforated in the left end walls of the small chambers $72_1$ and $72_2$ in communication with short tubes $74_1$ and $74_2$ projecting from the left end wall of the valve chamber 49, and the short tubes $74_1$ and $74_2$ communicate with the outer oil guide tube 41 via through holes $82_1$ and $82_2$, respectively.

In the normal operating state of the continuously variable transmission T, the first and second check valves $71_1$ and $71_2$ close the valve holes $73_1$ and $73_2$ by means of the pressures of the inner and outer oil passages 52 and 53, i.e., the pressures of the low and high pressure oil passages 56 and 57 to prevent the reverse flows of the working oil from the low and high pressure oil passages 56 and 57 toward the short tubes $74_1$ and $74_2$. Since the first check valve $71_1$ or the second check valve $71_2$ is opened if the low pressure oil passage 56 or the high pressure oil passage 57 decreases lower than the discharge pressure of the supply pump 44 due to a leakage of the working oil from the hydraulic closed circuit between the hydraulic pump P and the hydraulic motor M, the discharge oil from the supply pump 44 is supplied to the low pressure oil passage 56 or the high pressure oil passage 57 through the short tube $74_1$ or $74_2$.

A clutch valve 76 having a pair of slide holes $75_1$ and $74_2$ to be fitted over the outer peripheral surfaces of both the valve cylinders $50_1$ and $50_2$ is contained in the valve chamber 47. The outer peripheral surfaces of the valve cylinders $50_1$ and $50_2$ are formed at intermediate steps $77_1$ and $77_2$ as boundaries in a small diameter at the left side half portion thereof and in a large diameter at the right side half portion thereof, and the inner peripheral surfaces of the slide holes $75_1$ and $75_2$ are correspondingly formed in a small diameter at the left side half portion thereof and in a large diameter at the right side half portion thereof. Annular pressure bearing chambers $78_1$ and $78_2$ in abutments against the steps $77_1$ and $77_2$ of the valve cylinders $50_1$ and $50_2$ are formed at the intermediate portion between the slide holes $75_1$ and $75_2$, and the pressure bearing chambers $78_1$ and $78_2$ always communicate with the low and high pressure oil passages 56 and 57.

The clutch valve 76 can move between the clutch-on position abutting against the right end wall of the valve chamber 49 and the clutch-off position abutting against the left end wall thereof, and first valve holes $79_1$ and $79_2$ provided in the valve cylinders $50_1$ and $50_2$ to allow the low and high pressure oil passages 56 and 57 to communicate with the valve chamber 49 and second valve holes $80_1$ and $80_2$ provided in the valve cylinders $50_1$ and $50_2$ to allow the pressure bearing chambers $78_1$ and $78_2$ to communicate with oil release chambers $81_1$ and $81_2$ between the valve cylinders $50_1$ and $50_2$ and the short tubes $74_1$ and $74_2$ are opened or closed by the clutch valve 76. More specifically, all the first and second valve holes $79_1$ and $79_2$; $80_1$ and $80_2$ are closed at the clutch-on position of the clutch valve 76 and are open at the clutch-off position thereof.

The oil release chambers $81_1$ and $81_2$ communicate with the inner oil guide tube 40 through a forked through hole 83, and the valve chamber 49 communicates with the outer oil guide tube 41 via two through holes 84.

Figure 17:
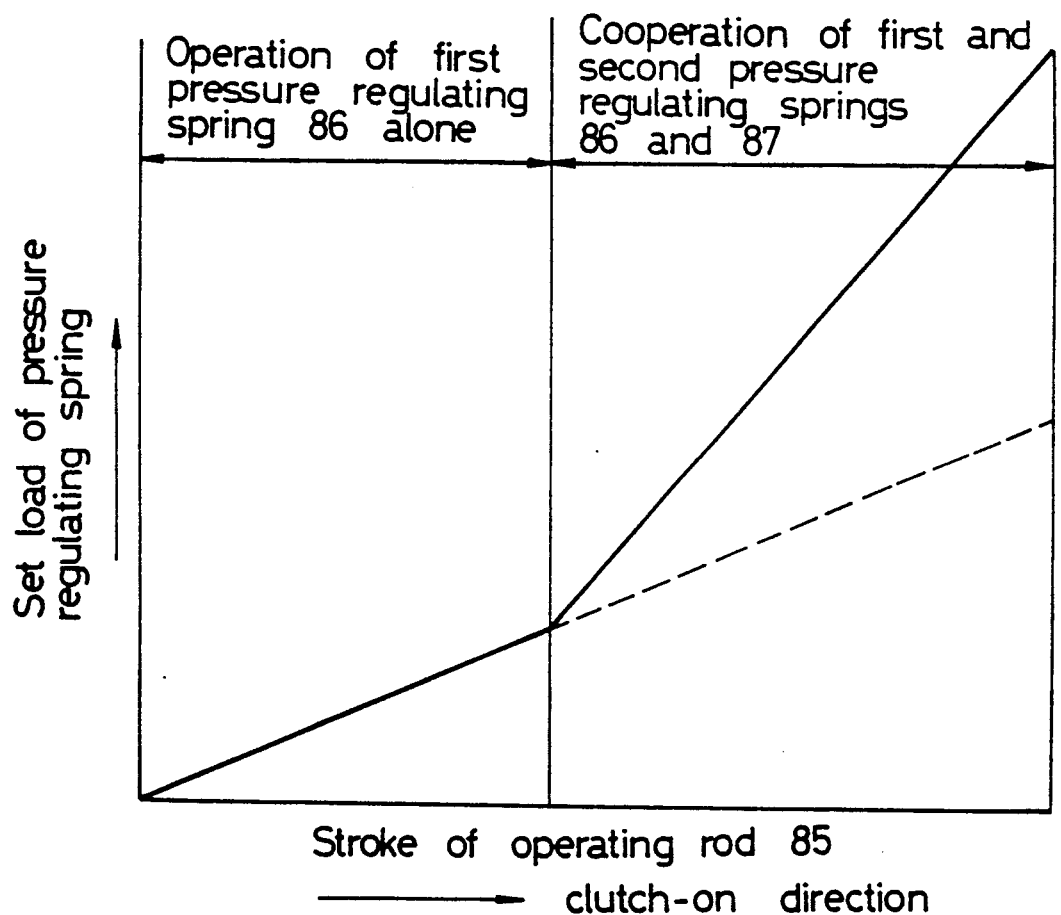
FIG. 17 is a characteristic diagram of the pressure regulating spring.

A pair of operating rods 85 and 85 penetrating through the left end wall of the valve chamber 49 are slidably borne on the left end wall of the valve chamber 49. These operating rods 85 and 85 are opposed to a pair of collars 76a and 76a formed at the right end of the clutch valve 76, and a first pressure regulating spring 86 and a second pressure regulating spring 87 surrounding the first spring 86 are interposed therebetween. The first pressure regulating spring 86 is set to a normal operating state to always urge the clutch valve 76 toward the clutch-on position, while the second pressure regulating spring 87 is so set in its free length as not to operate until the operating rods 85 and 85 are moved rightwardly at a predetermined distance from the leftward moving limit. Therefore, the total set load of both the pressure regulating springs 86 and 87 exhibits two-stage varying characteristic upon rightward movement of the operating rod 85 and an abrupt gradient in the latter half as shown in FIG. 17.

An operating ring 89 slidably supported on a guide cylinder 88 protruding from the supporting plate 43 is connected to the outer ends of both the operating rods 85 and 85 through release bearings 90. The operating ring 89 is operated by a clutch controller 91 to be described below.

At the times of coasting and accelerating of the continuously variable transmission T, the outer oil passage 53 and hence the high pressure oil passage 57 becomes under a high pressure, while at the time of decelerating of the continuously variable transmission T, the inner oil passage 52 and hence the low pressure oil passage 56 becomes under a high pressure. Accordingly, the high pressure is always acted on either one of the pressure bearing chambers $78_1$ and $78_2$ of the clutch valve 76. Since the above-mentioned diameter difference is provided at the front and rear half portions of the slide holes $75_1$ and $75_2$ of the clutch valve 76, the pressure bearing surfaces of the left end walls of the pressure bearing chambers $78_1$ and $78_2$ are larger than those of the right end walls thereof. As a result, a thrust leftward, i.e., toward the clutch-off direction is applied to the clutch valve 76 by the above-mentioned high pressure. If the thrust is smaller than the rightward-pressing force, i.e., toward the clutch-on direction by the first pressure regulating spring 86 or the first and second pressure regulating springs 86 and 87, the clutch valve 76 maintains the clutch-on position. However, if the thrust exceeds the rightward-pressing force, the clutch valve 76 moves toward the clutch-off position.

Since the first and second valve holes $79_1$ and $79_2$, $80_1$ and $80_2$ are closed at the clutch-on position of the clutch valve 76, the low and high pressure oil passages 56 and 57 are prevented from being interconnected and from being in communication with the oil release chambers $81_1$ and $81_2$. When the clutch valve 76 is moved toward the clutch-off position, the first and second valve holes $79_1$ and $79_2$, $80_1$ and $80_2$ are opened, the hydraulic pressure between both the oil passages 56 and 57 is short-circuited and a leakage of the hydraulic pressure oil from the oil passages 56 and 57 to the oil release chambers $81_1$ and $81_2$ occurs in response to the opening degrees of the first and second valve holes $79_1$ and $79_2$, $80_1$ and $80_2$, and the power transmission between the hydraulic pump P and the hydraulic motor M is alleviated or cut off.

Therefore, if an excessive normal or reverse load is applied to the continuously variable transmission T in the state that the operating ring 89 is shifted toward the clutch-on direction to apply the maximum set load to both the pressure regulating springs 86 and 87, the clutch valve 76 is displaced toward the clutch-off direction by means of the excessive hydraulic pressure generated in the high or low pressure oil passage 57 or 56 to release the hydraulic pressure, thereby alleviating the transmission of the excessive load.

In the state that the operating ring 89 is shifted toward the clutch-off direction to release the second pressure regulating spring 87 and the set load of the first pressure regulating spring 86 is minimized, the clutch valve 76 is immediately displaced toward the clutch-off direction by means of the hydraulic pressure of the high or low pressure oil passage 57 or 56, thereby obtaining the clutch-off state. Further, if the intermediate position of the operating ring 89 is regulated in the state that the second pressure regulating spring 87 is released, a half-clutch engaging state can be delicately regulated.

Since the valve opening pressure of the clutch valve 76 is regulated by regulating the set loads of the pressure regulating springs 86 and 87 by means of the displacement of the operating ring 89 as described above, even if the viscosity of the working oil varies due to a temperature change, the clutch can be always stably controlled by the operation of the operating ring 89.

It is noted that, if the pressure regulating spring is constructed in an unequal pitch type, only one pressure regulating spring may provide similar spring characteristics to those described above.

Figure 10:
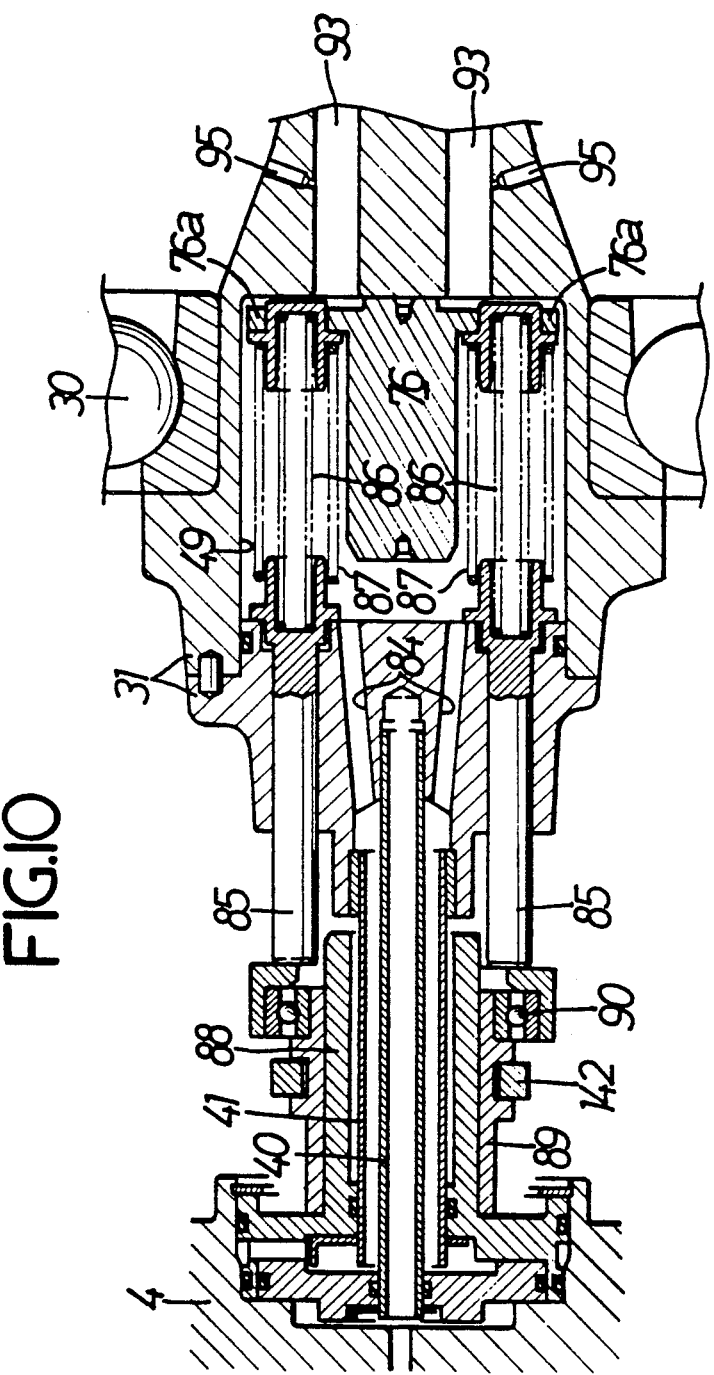
Figure 11:
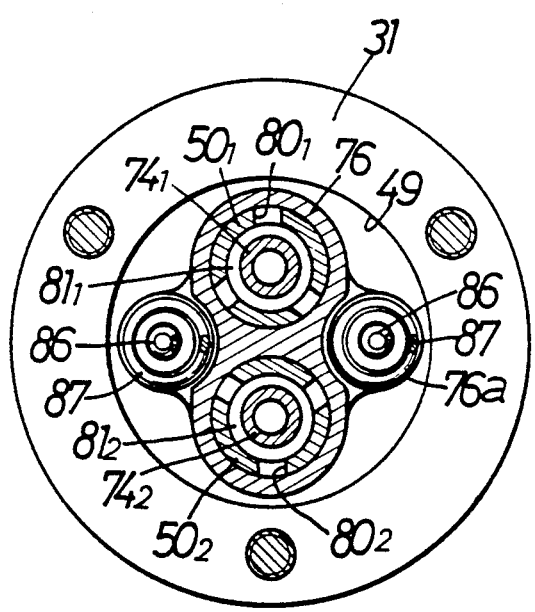

Referring to FIGS. 3 and 10, the output shaft 31 has two lubricating oil passages 93 and 93 perforated directly in the valve chamber 49, and both the oil passages 93 and 93 are connected to one lubricating oil passage 94 at the downstream side thereof. These oil passages 93 and 94 are in communication with a lubricating section around the output shaft 31 through a plurality of orifices 95, 95 -. Accordingly, during the operation of the continuously variable transmission T, part of the oil fed from the supply pump 44 to the outer oil guide tube 41 is also distributed to the lubricating oil passages 93 and 94 through the valve chamber 49, and further distributed to the plurality of orifices 95, 95 - to be supplied to the lubricating sections. In the above case, since the oil supplying amount to the lubricating sections is limited by the orifices 95, the supply of the working oil from the outer oil guide tube 41 to the low or high pressure oil passage 56 or 57 is not interrupted.

Then, referring to FIG. 12, a transmission controller 27, an eccentric wheel controller 34 and a clutch controller 91 will be described.

The transmission controller 27 will first be first explained.

The operating arm 25 of the motor swash plate holder 22 is connected to a piston rod 101a of a transmission piston 101 through a link 100. This transmission piston 101 is contained in a hydraulic cylinder 102 secured to the crank case 4. When the operating arm 25 moves rightward in response to movement of the hydraulic cylinder 102, it shifts the motor swash plate 20 to a low position side through the swash plate holder 2, while when the operating arm 25 moves leftward, it can set the motor swash plate 20 at the upright position to the top position side.

The hydraulic cylinder 102 is partitioned therein to a left side first operating chamber $103_1$ and a right side second operating chamber $103_2$ by the transmission piston 101, and a transmission valve 104 is connected to the operating chambers $103_1$ and $103_2$.

The transmission valve 104 is constituted of a cylinder-state valve box 105 secured to the crank case 4, a pair of left and right outer spool valves $106_1$ and $106_2$ slidably contained in the valve box 105, a pair of left and right inner spool valves $107_1$ and $107_2$ slidably engaged within the outer spool valves $106_1$ and $106_2$ and penetrated through both the end walls of the valve box 105, an outer spring 108 for urging the right outer spool valve $106_2$ leftward, and an inner spring 109 for urging both the inner spool valves $107_1$ and $107_2$ in a separating direction, and larger a set load than that of the inner spring 109 is applied to the outer spring 108.

The valve box 105 has, at one side thereof, first and second output ports $110_1$ and $110_2$ communicating with the first and second operating chambers $103_1$ and $103_2$, and, at the other side thereof, a pair of left and right input ports $111_1$ and $111_2$, a pair of left and right control ports $112_1$ and $112_2$, and a pair of left and right discharge ports $113_1$ and $113_2$.

The discharge port of the hydraulic pump 114 is connected to the input ports $111_1$ and $111_2$, and the discharge port of the supply pump 44 is connected to the discharge ports $113_1$ and $113_2$ through a first solenoid valve $115_1$. The discharge port of the supply pump 44 is connected to the control ports $112_1$ and $112_2$ through a second solenoid valve $115_2$. The controls ports $112_1$ and $112_2$ are also in communication with the oil reservoir 46 through a third solenoid valve $115_3$.

An orifice $116_1$ is provided in the inlet of the first solenoid valve $115_1$, and an orifice $116_2$ having a diameter smaller than that of the orifice $116_1$ is provided in the inlet of the second solenoid valve $115_2$.

The supply pump 44 intakes the oil from the oil reservoir 46, and a hydraulic pump 114 intakes the discharge oil of the supply pump 44. The discharge pressure of the supply pump 44 is regulated to a pressure, such as, for example, 12 kg/cm$^2$, adapted for the supply of the working oil to the continuously variable transmission T and the operations of the inner and outer spool valves $107_1$ and $107_2$, $106_1$ and $106_2$ by means of a first relief valve $117_1$, and the discharge pressure of the hydraulic pump 114 is regulated to a pressure, such as, for example, 35 kg/cm$_2$, adapted for the operation of the transmission piston 104 and the like by means of a second relief valve $117_2$.

The supply pump 44 and the hydraulic pump 114 are connected to the end of the crank shaft 1 of the engine E as shown in FIG. 1, and simultaneously driven by the shaft 1.

The first to third solenoid valves $115_1$ to $115_3$ are all of normal open type, and controlled as listed in the following table in case of performing a gear reduction of the transmission.

Figure 13:
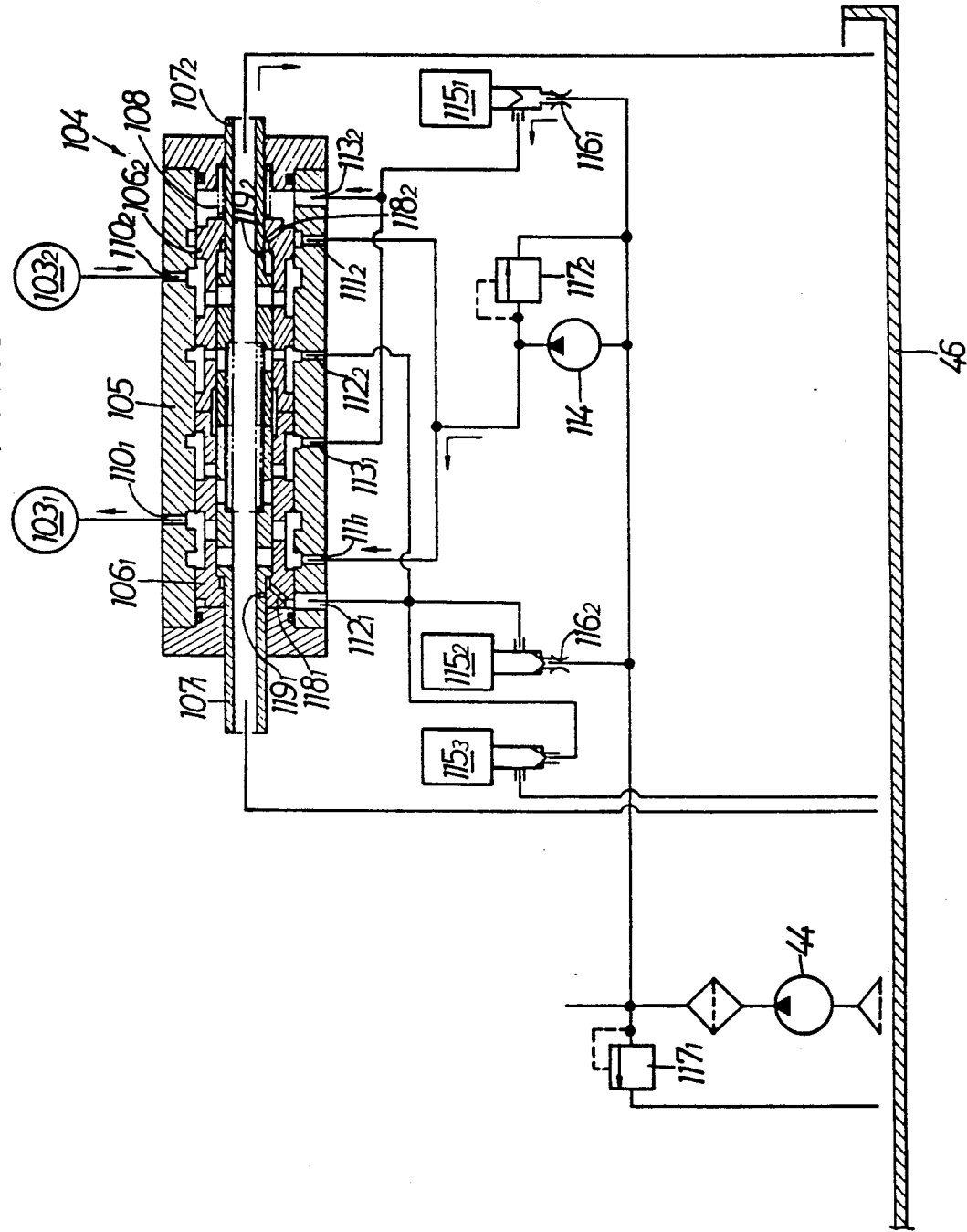
FIGS. 13 to 16 are explanatory views of the operations of the transmission valve in the transmission controller.
Figure 14:
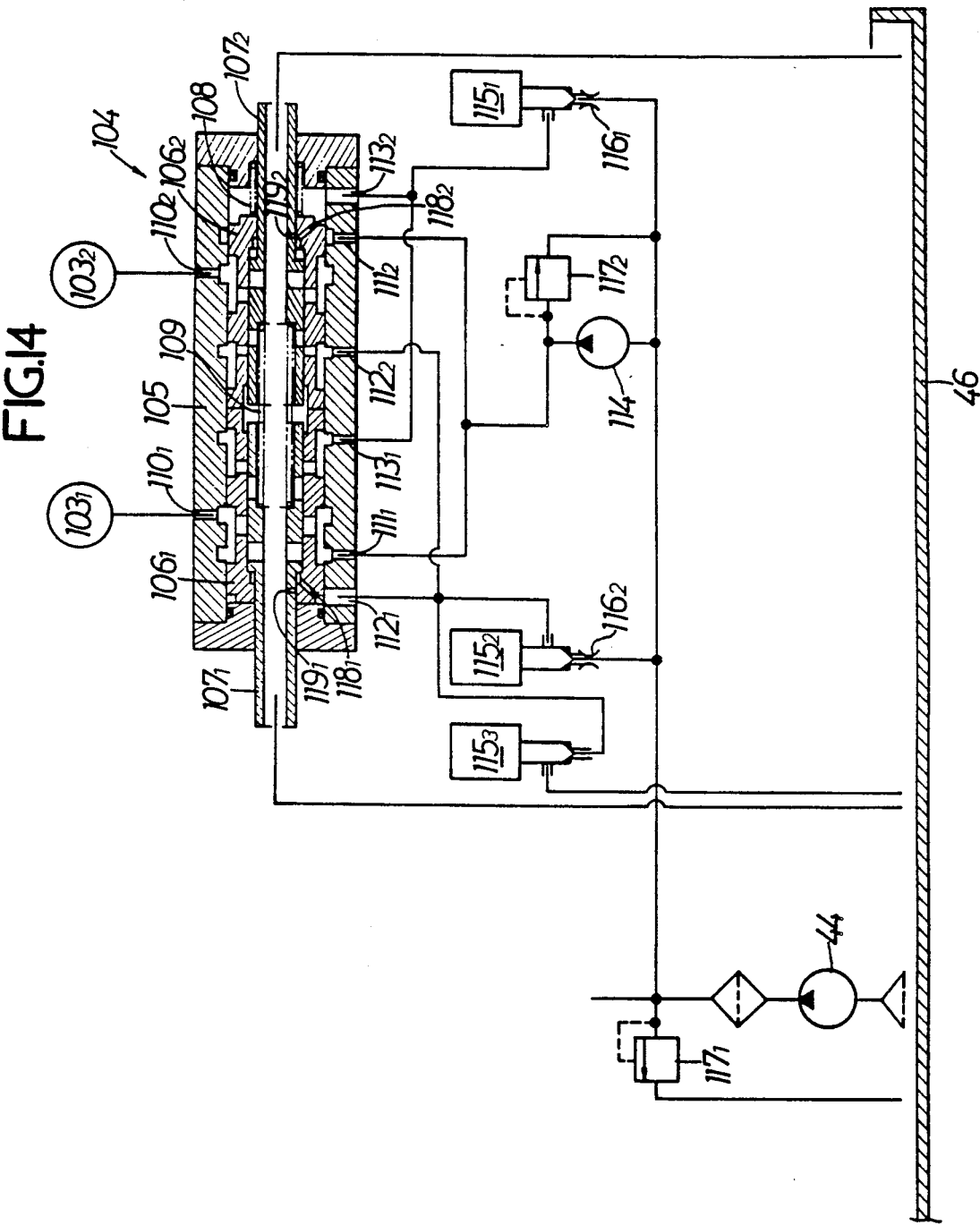
Figure 15:
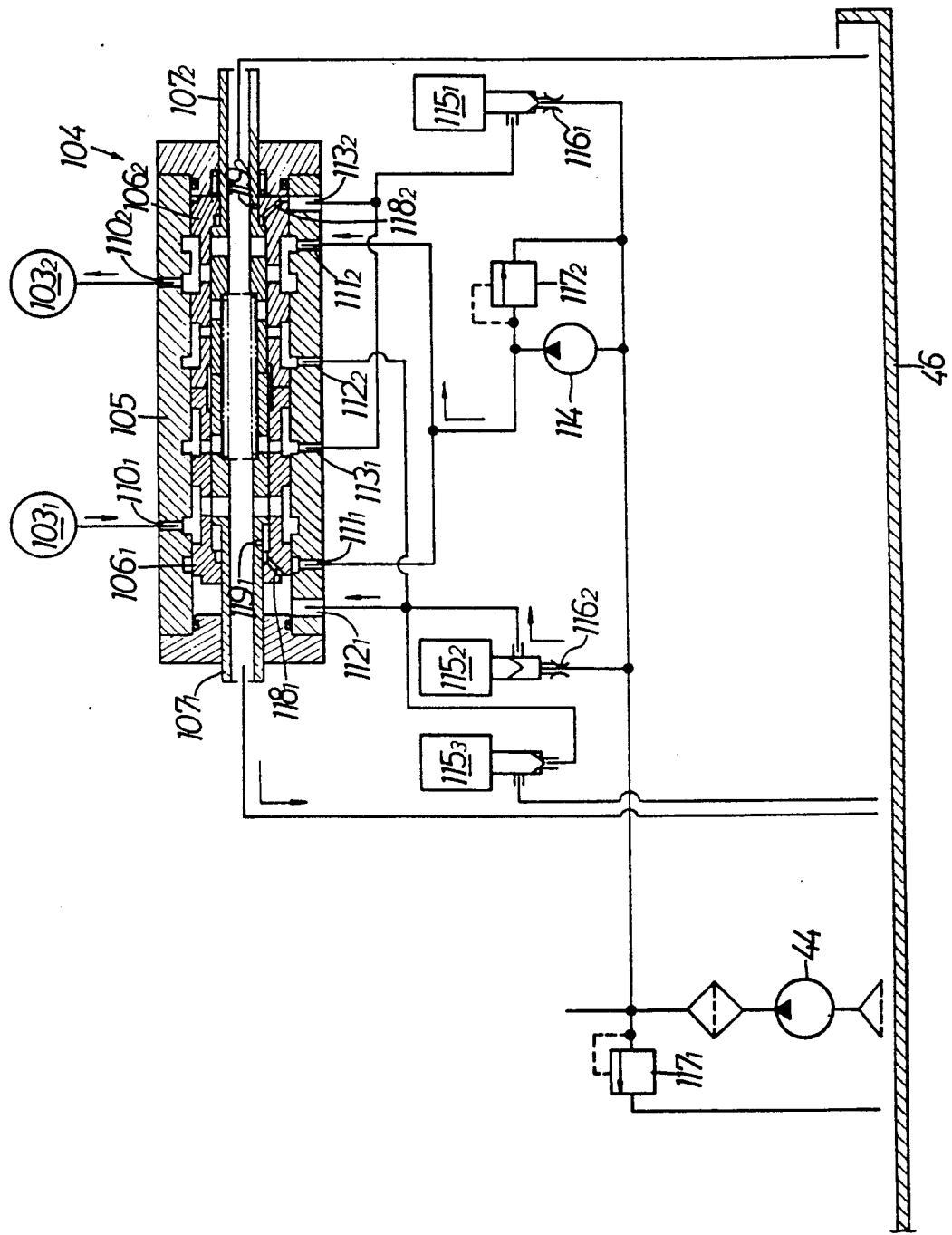
Figure 16:
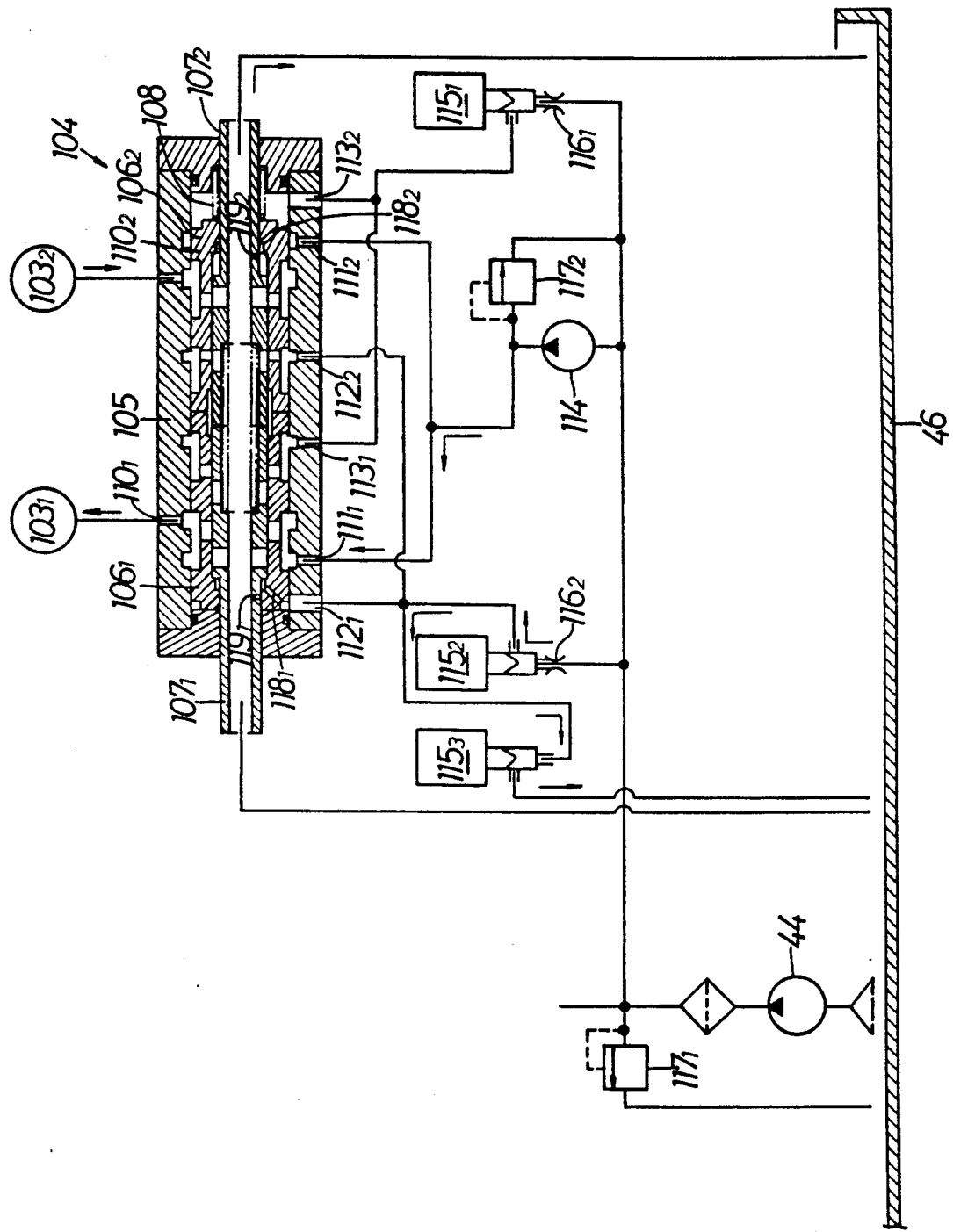

| Request gear reduction | 1st solenoid valve $115_1$ | 2nd solenoid valve $115_2$ | 3rd solenoid valve $115_3$ | Drawing of tr. valve |
|---|---|---|---|---|
| I low | opened | closed | closed | FIG. 13 |
| II hold | closed | closed | closed | FIG. 14 |
| III top | closed | opened | closed | FIG. 15 |
| IV trouble in electric | opened | opened | opened | FIG. 16 |

| Request gear reduction system | 1st solenoid valve 115₁ | 2nd solenoid valve 115₂ | 3rd solenoid valve 115₃ | Drawing of tr. valve |
|---|---|---|---|---|

-continued

In the state I of the above table, as shown in FIG. 13, the discharge pressure of the supply pump 44 is applied to the right end face of the right outer spool valve $106_2$ through the first solenoid valve $115_1$, and also applied to the right end face of the right inner spool valve $107_2$ through the orifice $118_2$ of the valve $106_2$. As a result, the right outer and inner spool valves $106_2$ and $107_2$ are moved leftward until they collide with the left outer and inner spool valves $106_1$ and $107_2$ to communicate between the first input and output ports $111_1$ and $110_1$, and the second output port $112_2$ communicates with the oil reservoir 26. Therefore, the discharge oil of the hydraulic pump 114 is introduced to the first operating chamber $103_1$ of the hydraulic cylinder 102, the transmission piston 101 is moved rightward upon receipt of the hydraulic pressure, thereby shifting the motor swash plate 20 to the low side.

When the gear reduction is set to the state II of the above table on the way of rightward movement of the transmission piston 101, as shown in FIG. 14, the hydraulic oil acting on the right end face of the right inner spool valve $107_2$ is released to the oil reservoir 46 through a leakage orifice $119_2$ of the valve, the right inner spool valve $107_2$ is thereby moved rightward by the repulsion force of the inner spring 108, and when the leakage orifice $119_2$ is closed by the right outer spool valve $106_2$, it is stopped. Thus, since the right inner spool valve $106_2$ shuts off the communication between the second operating chamber $103_2$ of the hydraulic cylinder 102 and the oil reservoir 46, the transmission piston 103 can be stopped on the way of the rightward movement.

When the gear reduction is set to the state III of the above table, as shown in FIG. 15, the discharge pressure of the supply pump 44 is acted on the left end face of the left outer spool valve $106_1$ through the second solenoid valve $115_2$, and also acted on the left end face of the left inner spool valve $107_1$ through the orifice $118_1$ of the valve $106_1$. As a result, the left outer and inner spool valves $106_1$ and $107_1$ move to the rightward moving limit together with the right outer and inner spool valves $106_2$ and $107_2$ to communicate between the second input and output ports $111_2$ and $110_2$ and to communicate between the first output port $110_1$ and the oil reservoir 46. Accordingly, the discharge oil of the hydraulic pump 114 is introduced to the second operating chamber $103_2$ of the hydraulic cylinder 102, the transmission piston 101 moves leftward upon receipt of the hydraulic pressure thereof, thereby moving the motor swash plate 20 to the upright position to the top side.

If the electric system of the first to the third solenoid valves $115_1$ to $115_3$ operating as the control means for the transmission valve 104 becomes defective during the operation of the continuously variable transmission T, all the solenoid valves are deenergized to open (in the state IV of the above table). In this case, as shown in FIG. 16, the discharge oil of the supply pump 44 is fed through both the first and second solenoid valves $115_1$ and $115_2$, but since the orifice $116_2$ of the inlet of the second solenoid valve $115_2$ is throttled more than the orifice $116_1$ of the inlet of the first solenoid valve $115_1$, the hydraulic oil passing the orifice $116_1$ presses the right end faces of the right outer and inner spool valves $106_2$ and $107_2$, but the hydraulic oil passing through the orifice $116_2$ is immediately released to the oil reservoir 44 through the third solenoid valve $115_2$. As a result, the right outer and inner spool valves $106_2$ and $107_2$ move to the leftward moving limit together with the left outer and inner spool valves $106_1$ and $106_2$ to communicate between the first input and output ports $111_1$ and $110_1$ and to communicate between the second output port $110_2$ and the oil reservoir 46. Accordingly, the discharge oil of the hydraulic pump 114 is introduced to the first operating chamber $103_1$ of the hydraulic cylinder 102, and the transmission piston 101 is moved rightward, and the motor swash plate 20 is shifted to the low side. Therefore, even if the electric system is defective, the impossibility of the start of a vehicle can be avoided.

Figure 12:
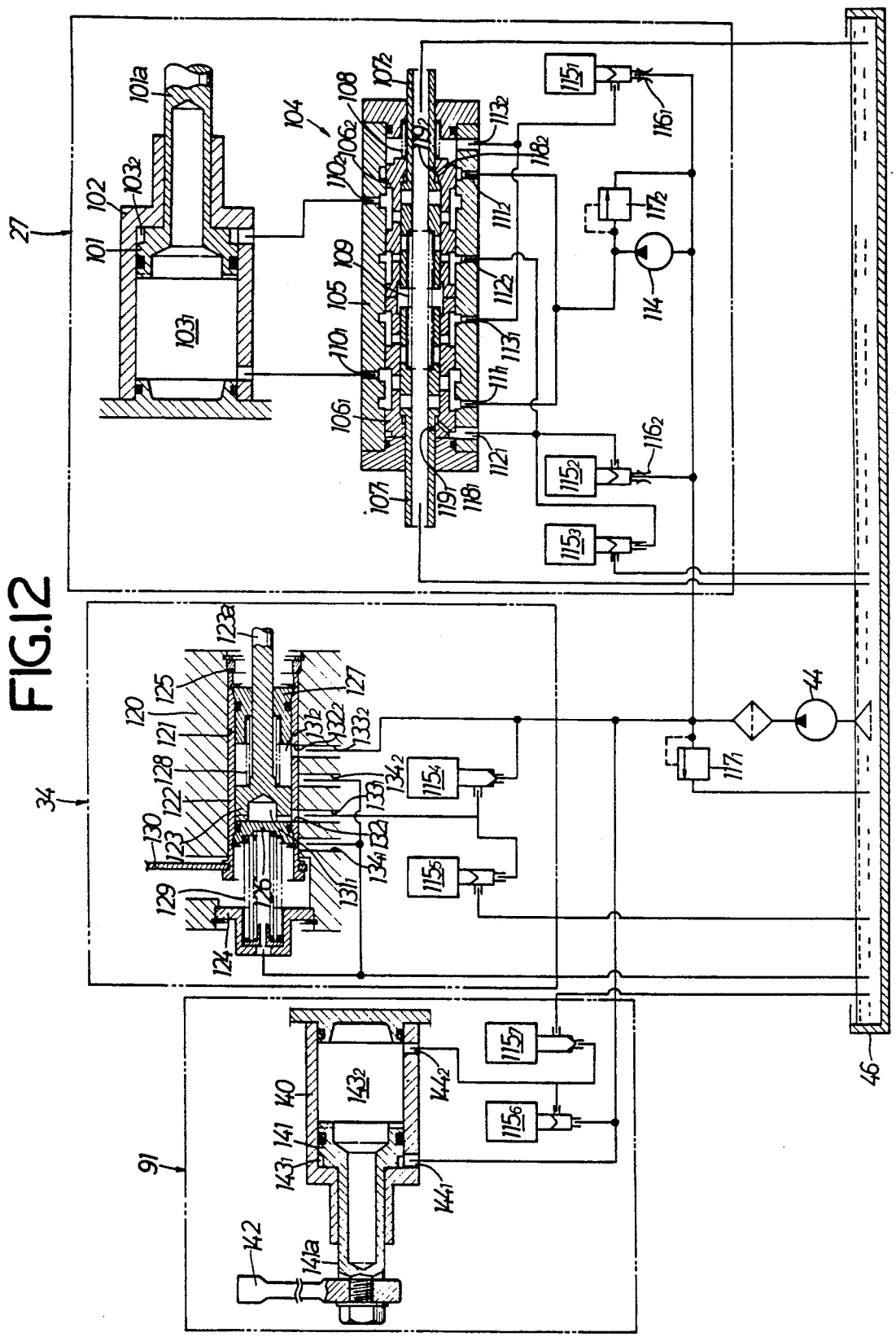
FIG. 12 is a longitudinal sectional view of a transmission controller, an eccentric wheel controller and a clutch controller of the continuously variable transmission.

If the operation of the engine E is stopped, the supply pump 44 and the hydraulic pump 114 are stopped, all the first to the third solenoid valves $115_1$ to $115_3$ are opened, and the transmission valve 104 is set to the state as shown in FIG. 12. That is, since the first and second output ports $110_1$ and $110_2$ are closed by the inner spool valves $107_1$ and $107_2$, the transmission piston 101 stays at the position it was in at that time the engine was stopped.

Next, the eccentric wheel controller 34 will be described.

In FIG. 12, the eccentric wheel controller 34 is constituted of a controller body 120 secured to the crank case 4, a cylinder 122 fitted in a cylinder hole 121 of the controller body 102 and capable of sliding at a predetermined stroke, and a piston 123 fitted in the cylinder 122 and capable of sliding at a predetermined stroke. The end of a piston rod 123a protruding from the right end face of the piston 123 is connected to the ear piece 33 of the second eccentric wheel 64.

The sliding stroke of the cylinder 122 is restricted by the contacts of the left and right end faces of the cylinder 122 with stopper walls 124 and 125 secured to the controller body 120. The sliding stroke of the piston 123 is restricted by the contacts of the left and right end faces of the piston 123 with end walls 126 and 127 secured to the cylinder 122. When the cylinder 122 is held at the rightward moving limit and the piston 123 is operated to the leftward moving limit, the second eccentric wheel 64 can be controlled to the clutch-on position n, while when the cylinder 122 is held at the rightward moving limit and the piston 123 is operated to the rightward moving limit, the second eccentric wheel 64 can be controlled to the lockup position l, and when both the cylinders 122 and 123 are operated to the leftward moving limit, the second eccentric wheel 64 can be controlled to the clutch-off position f.

The cylinder 122 is urged rightward by a return spring 129, and the piston 123 is urged leftward by a return spring 128 in the cylinder 122.

An operating arm 130 for operating the cylinder 122 is secured to one end of the cylinder 122, and the operating arm 130 is connected to a manual clutch actuator or an automatic clutch actuator, not shown.

The cylinder 121 is partitioned therein to a left first operating chamber $131_1$ and a right second operating chamber $131_2$ by the piston 123, and first and second ports $132_1$ and $132_2$ communicating with the chambers $131_1$ and $131_2$ are perforated in one side wall of the cylinder 122.

The controller body 120 is provided with a pair of left and right first and second input ports $133_1$ and $133_2$, and a pair of left and right first and second output ports $134_1$ and $134_2$. The first and second ports $132_1$ and $132_2$ communicate with the first and second input ports $133_1$ and $133_2$ at the rightward moving limit position of the cylinder 122, and the first and second ports $132_1$ and $132_2$ communicate with the first and second output ports $134_1$ and $134_2$ at the leftward moving limit position of the cylinder 122.

The second input port $133_2$ always communicates with the discharge port of the supply pump 44, the first input port $133_1$ communicates with the discharge port of the supply pump 44 through a fourth solenoid valve $115_4$, and communicates with the oil reservoir 46 through a fifth solenoid valve $115_5$. The first and second output ports $134_1$ and $134_2$ communicate with the oil reservoir 46.

When the fourth solenoid valve $115_4$ is closed and the fifth solenoid valve $115_5$ is opened as shown in FIG. 12 in the state that the cylinder 122 is held at the rightward moving limit, the discharge oil of the supply pump 44 is introduced to the second operating chamber $131_2$, and the oil of the first operating chamber $131_1$ is discharged to the oil reservoir 46. Accordingly, the piston 123 is moved leftward, thereby controlling the second eccentric wheel 64 to the clutch-on position n.

When the cylinder 122 is operated to the leftward moving limit from this state by the operating arm 130, the piston 123 is operated to follow up the cylinder 122 by the hydraulic pressure introduced from the supply pump 44 to the second operating chamber $131_2$, thereby controlling the second eccentric wheel 64 to the clutch-off position f.

When the fourth solenoid valve $115_4$ is opened and the fifth solenoid valve $115_5$ is closed in the state that the cylinder 122 is held at the rightward moving limit, the discharge oil of the supply pump 44 is introduced to both the first and second operating chambers $131_1$ and $131_2$, thereby pressing both the end faces of the piston 123, but since the left end face of the piston 123 is larger than the right end face thereof in the amount corresponding to the sectional area of the piston rod 123a, the piston 123 is moved rightward by the hydraulic pressure acting on the pressure bearing area difference, and the second eccentric wheel 64 is controlled to the lockup position l.

The clutch controller 91 will be now described. The clutch controller 91 is constituted of a hydraulic cylinder 140 secured to the crank case 4, and a piston 141 fitted in the hydraulic cylinder 104 and capable of sliding at a predetermined stroke, and a fork member 142 for operating the operating ring 89 is secured to a piston rod 141a protruding from the left end face of the piston 141. The set loads of the pressure regulating springs 86 and 87 are increased by the rightward movement of the piston 141.

The hydraulic cylinder, 140 is partitioned therein to a left first operating chamber $143_1$ and a right second operating chamber $143_2$ by the piston 141, and first and second ports $144_1$ and $144_2$ communicating with the first and second operating chambers $143_1$ and $143_2$ are perforated in one side wall of the hydraulic cylinder 140. The first port $144_1$ communicates with the discharge port of the supply pump 44, the second port $144_2$ communicates with the discharge port of the supply pump 44 through a sixth solenoid valve $115_6$, and communicates with the oil reservoir 46 through a seventh solenoid valve $115_7$.

As shown in FIG. 12, when the sixth solenoid valve $115_6$ is opened and the seventh solenoid valve $115_7$ is closed, the discharge oil of the supply pump 44 is introduced to both the operating chambers $143_1$ and $143_2$ to operate on both the end faces of the piston 141, but since the left end face of the piston 141 is smaller than the right end face thereof in the amount corresponding to the sectional area of the piston rod 141a, the piston 141 is moved leftward by the hydraulic pressure acting on the area difference therebetween, thereby decreasing the set loads of the pressure regulating springs 86 and 87.

On the contrary, when the sixth solenoid valve $115_6$ is closed and the seventh solenoid valve $116_7$ is opened, the discharge oil of the supply pump 44 is introduced only to the first operating chamber $143_1$, and the second operating chamber $143_2$ is opened with the oil reservoir 46. Therefore, the piston 141 is moved rightward, thereby increasing the set loads of the pressure regulating springs 86 and 87.

What is claimed is:

1. A hydrostatic continuously variable transmission comprising a hydraulic pump, a hydraulic motor, a hydraulic closed circuit between said hydraulic pump and said hydraulic motor, a clutch valve connected to said hydraulic closed circuit and capable of operating between a clutch-on position for setting said hydraulic closed circuit to a hydraulic transmitting state and a clutch-off position for setting said hydraulic closed circuit to a hydraulic transmission cut-off state, a pressure receiving chamber for urging said clutch valve to the clutch-off position upon receipt of the pressure of a high pressure portion of said hydraulic closed circuit, a pressure regulating spring means for urging said clutch valve to the clutch-on position, and a clutch controller connected to said pressure regulating spring means and capable of regulating the set load of said pressure regulating spring means.

2. A hydrostatic continuously variable transmission according to claim 1, wherein said pressure regulating spring means is composed to increase a spring constant thereof in response to the operation of said clutch controller toward said clutch-on direction.

3. A hydrostatic continuously variable transmission according to claim 2, wherein said pressure regulating spring means is comprised of a first pressure regulating spring means for always urging said clutch valve toward a clutch-on position, and a second pressure regulating spring means for urging said clutch valve toward said clutch-on position after said first regulating spring means is compressed a predetermined amount.

4. A hydrostatic continuously variable transmission according to claim 1, wherein said hydraulic closed circuit comprises a pair of oil passages, one of which becomes under a high pressure and the other of which becomes under a low pressure in response to the operation of said continuously variable transmission, and further comprising a pair of said pressure receiving chambers independently communicating with said pair of oil passages.

5. A hydrostatic continuously variable transmission according to claim 3, wherein an oil release passage means for releasing an oil pressure externally of said hydraulic closed circuit is provided, and said pair of oil passages commonly communicate with said oil release passage means at said clutch-off position.

6. A hydrostatic continuously variable transmission according to claim 1, wherein an oil release passage means for releasing an oil pressure externally of said hydraulic closed circuit is provided, and the high pressure portion of said hydraulic closed circuit communicates with said oil release passage means at said clutch-off position.

7. A hydrostatic continuously variable transmission according to claim 1, wherein said clutch controller comprises an operating rod abutting against one end of said pressure regulating spring means and said operating rod is movable to increase or decrease the set load of said pressure regulating spring means.

8. A hydrostatic continuously variable transmission according to claim 1, wherein at least one of said hydraulic pump and said hydraulic motor is of a swash plate type, having a swash plate capable of being regulated in its inclining angle, a holder for supporting said swash plate is connected to an operating arm integral with a piston slidably fitted in a cylinder, and a pair of operating chambers defined in said cylinder by said piston are controlled by a transmission valve in communication with an oil reservoir and a hydraulic pressure source.

9. A hydrostatic continuously variable transmission according to claim 8, wherein control means for controlling the operation of said transmission valve is provided, and when said control means is out of order, said transmission valve supplies the hydraulic pressure of said hydraulic pressure source to one of said operating chambers to move said piston, thereby inclining said swash plate.

10. A hydrostatic continuously variable transmission according to claim 1, wherein at least one of said hydraulic pump and said hydraulic motor is of a swash plate type, having a swash plate, a plurality of plungers abutting against said swash plate, and a plurality of cylinder bores slidably fitted with said plungers and annularly arranged, said hydraulic closed circuit comprising a high pressure oil passage and a low pressure oil passage, said cylinder bores alternately communicate with said high and low pressure oil passages through distribution valve means, said distribution valve means being capable of further selectively employing an operating state for externally releasing the hydraulic oil in said high pressure oil passage and an operating state for cutting off communication between said cylinder bores and said high and low pressure oil passages by a control device means for controlling an operation of said distribution valve means.

11. A hydrostatic continuously variable transmission according to claim 1, wherein said hydraulic pump, said hydraulic motor and said hydraulic closed circuit are arranged on a transmission shaft, and said clutch valve is provided at one axial end of said transmission shaft.

12. A hydrostatic continuously variable transmission according to claim 11, wherein the pressure of the high pressure portion of said hydraulic closed circuit is fed to said pressure receiving chamber through an oil passage formed in said transmission shaft.

13. A hydrostatic continuously variable transmission according to claim 11, wherein said clutch valve is disposed adjacent to said hydraulic motor.

* * * * *